(12) United States Patent
Butcher

(10) Patent No.: US 7,376,604 B1
(45) Date of Patent: May 20, 2008

(54) METHOD FOR INVESTING YIELD RESTRICTED MONIES

(75) Inventor: George H. Butcher, New Rochelle, NY (US)

(73) Assignee: Goldman Sachs & Co., New York, NY (US)

( * ) Notice: Subject to any disclaimer, the term of this patent is extended or adjusted under 35 U.S.C. 154(b) by 1122 days.

(21) Appl. No.: 10/034,419

(22) Filed: Dec. 27, 2001

(51) Int. Cl.
*G06Q 40/00* (2006.01)

(52) U.S. Cl. .............................. 705/35; 705/36; 705/37; 705/1; 705/38

(58) Field of Classification Search ............ 705/35–38, 705/1
See application file for complete search history.

(56) References Cited

U.S. PATENT DOCUMENTS

2002/0077955 A1* 6/2002 Ramm .......................... 705/37

OTHER PUBLICATIONS

Heap "Investments: Rochester Fund Manager Touts Virtues of Inverse Floaters", Bond Buyer. New York, N.Y.: Nov. 21, 1995.vol. 314, Iss. 29782; p. 24.*
David F. Babbel et al. "Inverse Floaters and Income Stability of a Debt Securities Investment Portfolio", Journal of Portfolio Management, winter 2000.*
"Oppenheimer Main Street California Tax-Exept Fund", supplement dates Sep. 9, 1994 to the Prospectus dated Oct. 25, 1993.*

* cited by examiner

*Primary Examiner*—Harish T. Dass
(74) *Attorney, Agent, or Firm*—Greenberg Traurig, LLP

(57) ABSTRACT

In one embodiment the present invention relates to a method for investing yield restricted monies including bond proceeds associated with at least one bond having a bond yield, wherein the bond proceeds achieve a return above the bond yield to which the bond proceeds would otherwise be restricted by regulation, comprising: obtaining the bond proceeds; and investing at least part of the bond proceeds in a tax-exempt inverse-floater financial instrument, wherein the inverse-floater financial instrument has a first rate of return which varies substantially inversely with regard to a second rate of return of a floater financial instrument. In another embodiment the present invention relates to a method for investing yield restricted monies including bond proceeds associated with a portfolio containing at least two bonds, wherein each of the bonds has a respective bond term and a respective bond yield, wherein the portfolio has a term overlapping at least the terms of each of the bonds, wherein an aggregate bond yield is formed of a combination of the yields of each of the bonds, and wherein the bond proceeds achieve an aggregate return, over the term of the portfolio, above the aggregate bond yield to which the bond proceeds would otherwise be restricted by regulation, comprising: obtaining the bond proceeds; and investing, for at least part of the term of a first one of the bonds contained in the portfolio, at least part of the bond proceeds in a tax-exempt inverse-floater financial instrument, wherein the inverse-floater financial instrument has a first rate of return which varies substantially inversely with regard to a second rate of return of a floater financial instrument.

3 Claims, 6 Drawing Sheets

FIG. 2A

| | | SRF Bond Yield | 4.678% | | Issuers Spread to BMA for VRDBs | | | PARS Costs | 0.000% |
| | | Leveraging Ratio | 9.00 | | Additional Spread for TICs if applicable | | | Liquidity Costs | 0.150% |
| | | Issuers Spread to MMD | 0.100% | | PARS or TIC spread to BMA | | | Remarketing Costs | 0.100% |
| | | Pars/INFOS spread | 0.000% | | | | | VRDB Costs | 0.250% |

| Current Maturity | INFLOS Escrow Investments | MMD | PARS/ INFLOS Spread to MMD | Fixed Rate on PARS/INFLOS | Annual BMA Rates | Annual Interest Available for PARS/ INFLOS | Aggregate PARS/ INFLOS Interest | INFLOS Interest | Additional Interest above bond yield if Not Limited |
|---|---|---|---|---|---|---|---|---|---|
| 07/14/01 | | | | | | | | | |
| 07/15/02 | 0 | 1.88% | 0.100% | 1.980% | 2.000% | 0 | 7,197,011 | 3,901,636 | 3,216,486 |
| 07/15/03 | 0 | 2.16% | 0.100% | 2.260% | 2.000% | 0 | 7,197,011 | 3,901,636 | 3,216,486 |
| 07/15/04 | 0 | 2.53% | 0.100% | 2.630% | 2.500% | 0 | 7,197,011 | 3,242,561 | 2,557,411 |
| 07/15/05 | 0 | 2.83% | 0.100% | 2.930% | 2.500% | 0 | 7,197,011 | 3,242,561 | 2,557,411 |
| 07/15/06 | 0 | 3.07% | 0.100% | 3.170% | 3.000% | 0 | 7,197,011 | 2,583,486 | 1,898,336 |
| 07/15/07 | 0 | 3.30% | 0.100% | 3.400% | 3.000% | 0 | 7,197,011 | 2,583,486 | 1,898,336 |
| 07/15/08 | 0 | 3.51% | 0.100% | 3.610% | 3.500% | 0 | 7,197,011 | 1,924,412 | 1,239,261 |
| 07/15/09 | 0 | 3.63% | 0.100% | 3.730% | 3.500% | 0 | 7,197,011 | 1,924,412 | 1,239,261 |
| 07/15/10 | 0 | 3.73% | 0.100% | 3.830% | 3.500% | 0 | 7,197,011 | 1,924,412 | 1,239,261 |
| 07/15/11 | 0 | 3.83% | 0.100% | 3.930% | 3.500% | 0 | 7,197,011 | 1,924,412 | 1,239,261 |
| 07/15/12 | 0 | 3.97% | 0.100% | 4.070% | 3.500% | 0 | 7,197,011 | 1,924,412 | 1,239,261 |
| 07/15/13 | 0 | 4.09% | 0.100% | 4.190% | 3.500% | 0 | 7,197,011 | 1,924,412 | 1,239,261 |
| 07/15/14 | 0 | 4.21% | 0.100% | 4.310% | 4.000% | 0 | 7,197,011 | 1,265,337 | 580,186 |
| 07/15/15 | 0 | 4.33% | 0.100% | 4.430% | 4.000% | 0 | 7,197,011 | 1,265,337 | 580,186 |
| 07/15/16 | 0 | 4.43% | 0.100% | 4.530% | 4.500% | 0 | 7,197,011 | 606,262 | 0 |
| 07/15/17 | 826,376 | 4.52% | 0.100% | 4.620% | 4.500% | 381,786 | 7,197,011 | 606,262 | 0 |
| 07/15/18 | 845,705 | 4.61% | 0.100% | 4.710% | 5.000% | 396,327 | 6,815,225 | 0 | 0 |
| 07/15/19 | 865,496 | 4.68% | 0.100% | 4.780% | 5.000% | 413,702 | 6,418,898 | 0 | 0 |
| 07/15/20 | 885,730 | 4.75% | 0.100% | 4.850% | 5.500% | 429,579 | 6,003,196 | 0 | 0 |
| 07/15/21 | 906,447 | 4.80% | 0.100% | 4.900% | 5.500% | 444,159 | 5,573,617 | 0 | 0 |
| 07/15/22 | 927,649 | 4.83% | 0.100% | 4.930% | 5.500% | 457,331 | 5,129,458 | 0 | 0 |
| 07/15/23 | 949,347 | 4.85% | 0.100% | 4.950% | 5.500% | 469,927 | 4,672,126 | 0 | 0 |
| 07/15/24 | 971,553 | 4.86% | 0.100% | 4.960% | 5.500% | 481,890 | 4,202,200 | 0 | 0 |
| 07/15/25 | 994,277 | 4.87% | 0.100% | 4.970% | 6.000% | 494,156 | 3,720,309 | 0 | 0 |
| 07/15/26 | 1,017,534 | 4.87% | 0.100% | 4.970% | 6.000% | 505,714 | 3,226,154 | 0 | 0 |
| 07/15/27 | 1,041,334 | 4.88% | 0.100% | 4.980% | 6.000% | 518,584 | 2,720,439 | 0 | 0 |
| 07/15/28 | 1,065,691 | 4.88% | 0.100% | 4.980% | 6.500% | 530,714 | 2,201,855 | 0 | 0 |
| 07/15/29 | 1,090,618 | 4.89% | 0.100% | 4.990% | 6.500% | 544,218 | 1,671,141 | 0 | 0 |
| 07/18/30 | 1,116,128 | 4.89% | 0.100% | 4.990% | 6.500% | 556,948 | 1,126,922 | 0 | 0 |
| 07/17/31 | 1,142,234 | 4.89% | 0.100% | 4.990% | 6.500% | 569,975 | 569,975 | 0 | 0 |
| | 14,646,109 | | | | | | | | 23,940,405 |

FIG 2B

| | Unhedged Additional INFLOS Yield | 11.637% |
| --- | --- | --- |
| | Total Unhedged INFLOS Yield | 16.315% |
| | Hedged Additional INFLOS Yield | 12.6757% |
| | Total Hedged INFLOS Yield | 17.554% |

Calculation of Incremental INFLOS Yield

| Current Maturity | Interest Reduction If Not Linked | Interest Earnings or Loss After Linking | Unhedged Additional INFLOS Earnings | Hedged Additional INFLOS Earnings | Unhedged Principal Plus Additional Interest | Present Value | Hedged Principal Plus Additional Interest | Present Value |
| --- | --- | --- | --- | --- | --- | --- | --- | --- |
| 07/14/01 | | | | | | | | |
| 07/15/02 | 0 | 345,507 | 3,216,486 | 3,216,486 | 3,216,486 | 2,881,212 | 3,216,486 | 2,849,582 |
| 07/15/03 | 0 | 345,507 | 3,216,486 | 3,216,486 | 3,216,486 | 2,580,886 | 3,216,486 | 2,524,531 |
| 07/15/04 | 0 | 345,507 | 2,557,411 | 2,557,411 | 2,557,411 | 1,838,152 | 2,557,411 | 1,778,276 |
| 07/15/05 | 0 | 345,507 | 2,557,411 | 2,557,411 | 2,557,411 | 1,646,550 | 2,557,411 | 1,575,428 |
| 07/15/06 | 0 | 345,507 | 1,898,336 | 1,898,336 | 1,898,336 | 1,094,816 | 1,898,336 | 1,036,026 |
| 07/15/07 | 0 | 345,507 | 1,898,336 | 1,898,336 | 1,898,336 | 980,697 | 1,898,336 | 917,847 |
| 07/15/08 | 0 | 345,507 | 1,239,261 | 1,239,261 | 1,239,261 | 573,480 | 1,239,261 | 530,835 |
| 07/15/09 | 0 | 345,507 | 1,239,261 | 1,239,261 | 1,239,261 | 513,703 | 1,239,261 | 470,283 |
| 07/15/10 | 0 | 345,507 | 1,239,261 | 1,239,261 | 1,239,261 | 460,156 | 1,239,261 | 416,636 |
| 07/15/11 | 0 | 345,507 | 1,239,261 | 1,239,261 | 1,239,261 | 412,192 | 1,239,261 | 369,112 |
| 07/15/12 | 0 | 345,507 | 1,239,261 | 1,239,261 | 1,239,261 | 369,226 | 1,239,261 | 327,007 |
| 07/15/13 | 0 | 345,507 | 1,239,261 | 1,239,261 | 1,239,261 | 330,740 | 1,239,261 | 289,706 |
| 07/15/14 | 0 | 345,507 | 580,186 | 580,186 | 580,186 | 138,703 | 580,186 | 120,160 |
| 07/15/15 | 0 | 345,507 | 580,186 | 580,186 | 580,186 | 124,245 | 580,186 | 106,454 |
| 07/15/16 | (78,889) | 345,507 | (78,889) | 345,507 | (78,889) | (15,133) | 345,507 | 56,163 |
| 07/15/17 | (78,889) | 345,507 | (78,889) | 747,487 | 128,440 | 1,171,883 | 168,763 | |
| 07/15/18 | (646,492) | 350,303 | (646,492) | 350,303 | 199,213 | 30,663 | 1,196,008 | 152,590 |
| 07/15/19 | (606,930) | 347,600 | (606,930) | 347,600 | 258,556 | 35,648 | 1,213,086 | 137,114 |
| 07/15/20 | (566,442) | 338,775 | (566,442) | 338,775 | 319,288 | 39,433 | 1,224,505 | 122,617 |
| 07/15/21 | (525,007) | 323,544 | (525,007) | 323,544 | 381,440 | 42,199 | 1,229,991 | 109,117 |
| 07/15/22 | (482,603) | 303,424 | (482,603) | 303,424 | 445,046 | 44,103 | 1,231,073 | 96,755 |
| 07/15/23 | (439,208) | 280,051 | (439,208) | 280,051 | 510,140 | 45,284 | 1,229,398 | 85,602 |
| 07/15/24 | (394,797) | 254,232 | (394,797) | 254,232 | 576,756 | 45,861 | 1,225,785 | 75,614 |
| 07/15/25 | (349,347) | 226,838 | (349,347) | 226,838 | 644,930 | 45,937 | 1,221,115 | 66,734 |
| 07/15/26 | (302,835) | 197,809 | (302,835) | 197,809 | 714,599 | 45,600 | 1,215,342 | 58,842 |
| 07/15/27 | (255,234) | 168,100 | (255,234) | 168,100 | 786,100 | 44,927 | 1,209,434 | 51,876 |
| 07/15/28 | (206,520) | 136,656 | (206,520) | 136,656 | 859,171 | 43,965 | 1,202,347 | 45,690 |
| 07/15/29 | (156,866) | 104,476 | (156,866) | 104,476 | 933,951 | 42,830 | 1,195,094 | 40,234 |
| 07/16/30 | (105,647) | 70,453 | (105,647) | 70,453 | 1,010,481 | 41,509 | 1,188,580 | 35,390 |
| 07/17/31 | (53,434) | 35,634 | (53,434) | 35,634 | 1,088,800 | 40,064 | 1,177,867 | 31,123 |
| | | | 18,691,486 | 27,769,312 | | 14,646,109 | | 14,646,109 |
| | | | | | | 14,646,109 | | 14,646,109 |
| | | | | | | 0 | | 0 |
| | | | | | | (cntrl + J) | | (cntrl + Y) |

FIG 2B¹

| | | Linked PARS/INFLOS | |
|---|---|---|---|
| VRDB Yield | 3.943% | PARS/INFLOS Yield | 4.924% |
| BMA Yield | 3.693% | Bond Yield | 4.678% |
| | | Positive (Negative) Arb When Linked | 0.245716% |

| VRDB Debt Service | Present Value | Annual INFLOS Interest Rate | Total Pars/ INFLOS Debt Service | Present Value |
|---|---|---|---|---|
| 329,537 | 317,037 | 26.639% | 7,197,011 | 6,859,277 |
| 329,537 | 305,011 | 26.639% | 7,197,011 | 6,537,392 |
| 402,768 | 358,650 | 22.139% | 7,197,011 | 6,230,612 |
| 402,768 | 345,046 | 22.139% | 7,197,011 | 5,938,226 |
| 475,999 | 392,313 | 17.639% | 7,197,011 | 5,659,565 |
| 475,999 | 377,431 | 17.639% | 7,197,011 | 5,393,979 |
| 549,229 | 416,978 | 13.139% | 7,197,011 | 5,140,856 |
| 549,229 | 403,085 | 13.139% | 7,197,011 | 4,899,611 |
| 549,229 | 387,795 | 13.139% | 7,197,011 | 4,669,688 |
| 549,229 | 373,065 | 13.139% | 7,197,011 | 4,450,553 |
| 549,229 | 358,933 | 13.139% | 7,197,011 | 4,241,702 |
| 549,229 | 345,317 | 13.139% | 7,197,011 | 4,042,852 |
| 622,460 | 376,514 | 8.639% | 7,197,011 | 3,852,943 |
| 622,460 | 362,232 | 8.639% | 7,197,011 | 3,672,136 |
| 695,690 | 389,491 | 4.139% | 7,197,011 | 3,499,814 |
| 1,522,066 | 819,823 | 4.139% | 15,460,769 | 7,165,559 |
| 1,571,241 | 814,207 | 0.000% | 15,272,275 | 6,746,039 |
| 1,546,623 | 771,048 | 0.000% | 15,071,760 | 6,345,053 |
| 1,581,971 | 758,754 | 0.000% | 14,860,496 | 5,962,533 |
| 1,551,759 | 716,032 | 0.000% | 14,638,091 | 5,597,681 |
| 1,520,840 | 675,145 | 0.000% | 14,405,951 | 5,250,393 |
| 1,489,198 | 636,021 | 0.000% | 14,165,599 | 4,920,520 |
| 1,456,816 | 598,589 | 0.000% | 13,917,726 | 4,607,555 |
| 1,461,016 | 577,543 | 0.000% | 13,663,084 | 4,310,991 |
| 1,422,130 | 540,847 | 0.000% | 13,401,491 | 4,030,025 |
| 1,382,334 | 505,771 | 0.000% | 13,133,780 | 3,764,181 |
| 1,363,681 | 480,019 | 0.000% | 12,858,766 | 3,512,419 |
| 1,316,674 | 445,892 | 0.000% | 12,577,319 | 3,274,321 |
| 1,268,567 | 413,304 | 0.000% | 12,288,198 | 3,048,931 |
| 1,219,335 | 382,195 | 0.000% | 11,992,315 | 2,835,885 |
| | 14,646,109 | | | 146,461,094 |
| | 14,646,109 | | | 146,461,094 |
| | 0 | | | 0 |
| | (cntrl + X) | | | (cntrl + U) |

FIG. 2C

Calculation of Breakeven BMA Rate

| | | |
|---|---|---|
| Alternative Sizes of Adjustments | 0.0001000 | 1 |
| In Calculating Breakeven BMA | 0.0001000 | 2 |
| Yield | 0.0000100 | 3 |
| | 0.0000010 | 4 |

Breakdown Rate for BMA PAR&INFLOS refunding     Adjustment Currently in Use     4

| | | |
|---|---|---|
| First Estimate Actual Breakeven BMA Yield | 2.000% | |
| | 3,216.486 | (cntrl + O) |
| | 11.6355430438l7% | |
| Further Estimate of Breakeven BMA Yield | 2.0000100% | (cntrl + S) |
| | N/A | (cntrl + J) |
| | | (cntrl + Y) |
| Prior Calculated Breakeven BMA Yield | 4.456% | (cntrl + X) |
| Estimated Cap on BMA Rate | | |
| Positive or (Negative) Arbitrage once PARS/INFLOS are linked | 358.878 | |
| INFLOS Rates at which Arbitrage on INFLOS is equivalent | 7.135% | |
| Effective Cap on BMA Achievable by Linking | 4.178% | |
| Maximum Loss versus Taxable Escrow Investments | 0.000% | |

Breakeven Rate for traditional PARS or VRDBS of the same maturity

| | | |
|---|---|---|
| | PARS/INFLOS Yield | 4.924% |
| minus | PARS/INFLOS Spread to MMD | 0.000% |
| minus | Variable Rate Program Costs | (0.250%) |
| plus | Difference btwn SRF and INFLOS Issuers spreads to MMD | 0.000% |
| equals | SRF's Breakeven Variable Rate versus fixed rate debt | 4.674% |
| minus | Spread to BMA | (0.100%) |
| | SRF's Breakeven BMA Rate for traditional PARS or VRDBs | 4.574% |
| | Breakeven BMA Rate for PARS/INFLOS | 4.459% |
| | Effective Cap on BMA | 4.178% |
| | Reduction of BMA Rate at which a Loss Occurs for PARS/INFLOS | 0.000% |

Current Maturity: 7/15/01, 7/15/02, 7/15/03, 7/15/04, 7/15/05, 7/15/06, 7/15/07, 7/15/08, 7/15/09, 7/15/10, 7/15/11, 7/15/12, 7/15/13, 7/15/14, 7/15/15, 7/15/16, 7/15/17, 7/15/18, 7/15/19, 7/15/20, 7/15/21, 7/15/22, 7/15/23, 7/15/24, 7/15/25, 7/15/26, 7/15/27, 7/15/28, 7/15/29, 7/15/30, 7/15/31

FIG 2C¹

Summary of Results of INFLOS Investments Strategy

| | |
|---|---:|
| PV Savings from INFLOS | 2,287640% |
| % of Reserve Investment in PARS/INFLOS | 58.584% |
| Positive Arbitrage on Total Reserve Investments | 0.763% |
| PV Savings as % of total invested funds | 6.119% |
| Leveraging Ratio | 9.000 |
| VRDBPARS INFLOS Spread | 0.100% |
| VRDB Yield | 3.9428% |
| VRDB Spread to BMA | 0.250% |
| VRDB Costs | 0.250% |
| BMA Ratio | 2.009% |

| | |
|---|---:|
| Level Debt Service | O.K. |
| Bond Yield | O.K. |
| Escrow Yield | O.K. |
| Additional INFLOS Yield | O.K. |
| VRDB Yield | O.K. |
| PARS/INFLOS Bond Yield | O.K. |

INFLOS Investment versus Variable Rate Debt

| | |
|---|---:|
| Breakeven Rate for INFLOS versus a variable investment | 4.459% |
| Breakeven Rate for variable rate debt versus fixed rate debt | 4.574% |
| Effective Cap on BMA | 4.178% |

Savings or Dissavings versus Traditional VRDBs

| |
|---:|
| 3,097,813 |

US 7,376,604 B1

METHOD FOR INVESTING YIELD RESTRICTED MONIES

FIELD OF THE INVENTION

In one embodiment the present invention relates to a method for investing yield restricted monies including bond proceeds associated with at least one bond having a bond yield, wherein the bond proceeds achieve a return above the bond yield to which the bond proceeds would otherwise be restricted by regulation, comprising: obtaining the bond proceeds; and investing at least part of the bond proceeds in a tax-exempt inverse-floater financial instrument, wherein the inverse-floater financial instrument has a first rate of return which varies substantially inversely with regard to a second rate of return of a floater financial instrument.

In another embodiment the present invention relates to a method for investing yield restricted monies including bond proceeds associated with a portfolio containing at least two bonds, wherein each of the bonds has a respective bond term and a respective bond yield, wherein the portfolio has a term overlapping at least the terms of each of the bonds, wherein an aggregate bond yield is formed of a combination of the yields of each of the bonds, and wherein the bond proceeds achieve an aggregate return, over the term of the portfolio, above the aggregate bond yield to which the bond proceeds would otherwise be restricted by regulation, comprising: obtaining the bond proceeds; and investing, for at least part of the term of a first one of the bonds contained in the portfolio, at least part of the bond proceeds in a tax-exempt inverse-floater financial instrument, wherein the inverse-floater financial instrument has a first rate of return which varies substantially inversely with regard to a second rate of return of a floater financial instrument.

For the purposes of the present application the term "yield restricted monies" is intended to include, but not be limited to, any bond proceeds associated with one or more tax-exempt bonds (e.g., issued by a municipal issuer). Any yield earned on yield restricted monies (e.g., bond proceeds) greater than the yield of the bonds themselves must generally be turned over to the government (e.g., the Federal government). That is, any yield earned on yield restricted monies greater than the yield of the bonds themselves may generally not be retained.

Further, for the purposes of the present application the term "direct bond proceeds" is intended to include, but not be limited to, any bond proceeds which comprise yield restricted monies and which represent direct proceeds from the sale of one or more bonds. Examples of such direct bond proceeds include, but are not limited to, proceeds from the issuance of one or more new money bonds and proceeds from the issuance of one or more refunding bonds (e.g., one or more advance refunding bonds or one or more refunding bonds other than advance refunding bonds).

Further still, for the purposes of the present application the term "deemed bond proceeds" is intended to include, but not be limited to, any monies which are not "direct bond proceeds" and which are "deemed" under the appropriate tax laws and regulations to be bond proceeds which comprise yield restricted monies. Examples of such deemed bond proceeds include, but are not limited to, pledged funds, sinking funds, and replacement funds.

Further still, for the purposes of the present application the term "pledged funds" is intended to include, but not be limited to, any finds reasonably assured to be available in the event an issuer (e.g., a bond issuer) encounters financial difficulty (e.g., would otherwise be in default of an obligation if not for the use of the pledged funds). As one example, pledged funds may be legally pledged.

Further still, for the purposes of the present application the term "sinking finds" is intended to include, but not be limited to, any finds expected to be used to pay debt service (e.g., debt service on one or more bonds).

Further still, for the purposes of the present application the term "restricted by regulation" is intended to include, but not be limited to, being restricted by any applicable code(s), statute(s), law(s), and/or judicial interpretation(s) which are enacted or required by a governmental or political entity (e.g., an agency of the federal, state, or local government).

Further still, for each term which is identified herein as "intended to include, but not be limited to" certain definition(s), when such term is used in the claims the term is to be construed more specifically as "intended to include at least one of the definition(s)".

BACKGROUND OF THE INVENTION

Traditionally, when one or more tax-exempt bonds is issued (e.g., by a municipal issuer), the bond proceeds associated therewith are typically yield restricted monies. Thus, in order to maintain the tax-exempt status of such bonds, any yield on the bond proceeds greater than the bond yield itself must generally be turned over to the Federal government.

Also, in the financial field, a pair of instruments designed to create a fixed rate liability by combining two variable rate components has been utilized to issue debt. For example, bonds have been issued as "INFLOS" (a proprietary financial mechanism designed to create a fixed rate liability by combining two variable rate components). Of note, if a traditional fixed rate bond would bear interest at 5.20%, for example, the interrelated pair of financial instruments might bear a fixed rate of 5.10% (the difference being designed to give an incentive to utilize the interrelated pair structure).

Nevertheless, it is believed that no conventional mechanism exists for structuring a bond issue (i.e., a tax-exempt bond issue) to achieve unrestricted earnings on at least a portion of bond proceeds by investing in an inverse-floater, as provided for by the present invention.

BRIEF DESCRIPTION OF THE DRAWINGS

FIGS. 2A, 2B, and 2C, which respectively depict the leftmost, the middle, and the rightmost portions of a spreadsheet, show one example of a financial analysis related to an embodiment of the present invention.

Figure 1:
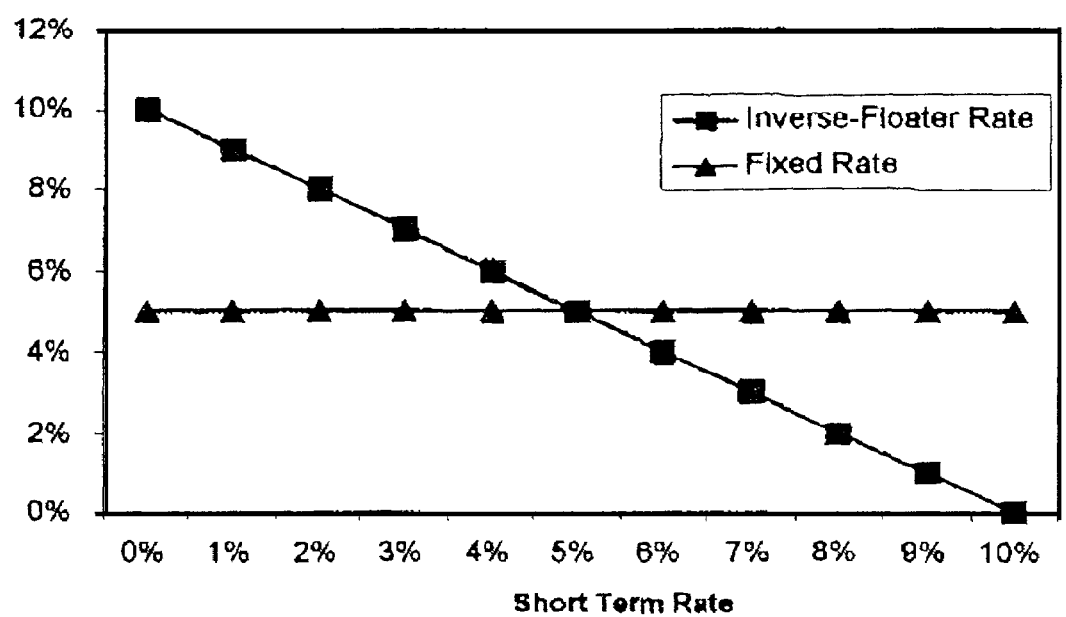
FIG. 1 shows a chart depicting how the inverse-floater rate varies inversely with short-term tax-exempt rates.

Among those benefits and improvements that have been disclosed, other objects and advantages of this invention will become apparent from the following description taken in conjunction with the accompanying figures. The figures constitute a part of this specification and include illustrative embodiments of the instant invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In summary, one embodiment of the present invention may operate as follows. A mechanism may be provided to enable an issuer (e.g., a municipal issuer) of one or more bonds (e.g., tax-exempt bonds) to achieve returns that are above market and/or above the bond yield to which bond proceeds would ordinarily be restricted. In other words, a bond issue may be structured to achieve unrestricted earnings on at least a portion of the bond proceeds which would ordinarily be yield restricted (i.e., an embodiment of the present invention may provide a mechanism to permit an issuer to retain a yield earned on yield restricted monies which is greater than the yield of the underlying bonds themselves).

Further, in another embodiment of the present invention a mechanism may be provided to permit an issuer (e.g., a municipal issuer) of one or more bonds (e.g., tax-exempt bonds) to essentially eliminate the risk of the yield on bond proceeds going below a predetermined fixed rate (i.e., the yield on a linked inverse-floater financial instrument and floater financial instrument) by providing for the possible linking of the inverse-floater financial instrument with the floater financial instrument (i.e., the issuer may thus produce "downside" protection by locking-in the fixed rate of the linked interrelated pair).

A floater financial instrument and a corresponding inverse-floater financial instrument may be referred to as an "interrelated pair". In one example, the interrelated pair may include:

(1) A first component, known as a "floater". The floater, which may be a bond, may be a Dutch auction product and may bear a short-term variable rate comparable to a variable rate demand bond ("VRDB"). Typically the yield on such a VRDB (as well as on such a floater) is described in relation to "BMA" (i.e., the Bond Market Association Municipal Bond Index), which is an index that represents an approximation of a typical variable rate bond yield. For example, a bond issue forming the floater component of the interrelated pair might bear an interest rate between BMA plus or minus 10 basis points.

(2) A second component, known as an "inverse-floater". The inverse-floater, which may be a bond, may be of an amount equal to the floater and may bear an interest rate that varies inversely to the interest rate of the floater.

In operation, the interest rates of the two components are designed to vary inversely such that the interest rate on the combination of the two bonds substantially equals the rate on a fixed rate bond. In other words, the holder of both components of a floater/inverse-floater interrelated pair of bonds, for example, may receive all of the fixed rate on the bonds that is not required to pay the interest, remarketing and liquidity costs on the floater bond or bonds.

Of note, each component of an "interrelated pair" (e.g., an "interrelated pair" of bonds) need not necessarily have originally been issued together as a pair (in terms of issue time and/or value) or with the assumption that the two components would later form an "interrelated pair". In other words, each component of an "interrelated pair" may have been issued in a manner unrelated to the other. What makes the "interrelated pair" a pair is the inverse interest rate relationship between the two components, without regard to how such inverse interest rate relationship came to be.

In any case, to give a more concrete example of an interrelated pair of bonds (which example is intended to be illustrative and not restrictive), assume that an interrelated pair of bonds in the total amount of $20,000 consists of a $10,000 floater bond and a $10,000 inverse-floater bond. The total interest on the interrelated pair would equal $20,000 times 5.10% in this example. A portion of the interest (e.g., 28 basis points on the floater) might go to pay the remarketing and liquidity expenses for the floater. If the floater were to trade at BMA (and BMA were equal to 2.50%), the interest on the inverse-floater would be calculated as follows:

TABLE 1

| Fixed Interest | $20,000 | Times | 5.10% | equals | $1,020 |
| Floater Interest | ($10,000) | Times | 2.50% | equals | ($250) |
| Floater Expenses | ($10,000) | Times | 0.28% | equals | ($28) |
| Inverse-Floater Interest | | | | Total | $742 |
| Inverse-Floater Yield | $742 | divided by | $10,000 | equals | 7.42% |

In another calculation, if the floater rate decreases to 1.75% for example, the inverse-floater rate would be 8.17%. On the other hand, if the floater rate increases to 3.25% for example, the inverse-floater rate would be 6.67%. Since the maximum interest available on the interrelated pair is $1020 (given the 5.10% fixed interest parameter), the maximum interest that can be paid on either component is $1020 less $28 or 9.92%, at which rate the other component would bear interest at 0%.

Of note, the maximum floater rate can be increased by structuring the interrelated pair fixed rate at a premium to the current market. The inverse-floater component could then be sold at a premium to par and priced either to call or, if non-callable, to maturity. However, the use of a premium coupon might increase the likelihood that callable bonds would be redeemed and increase the interrelated pair issuer's costs if the bonds remain outstanding to maturity.

Of further note, the floater and inverse-floater may be held by separate holders. However, the holder of the inverse-floater may purchase the floater and "link" the two parts together (conversely the "linked" pair may also be "de-linked", whereby a "de-linked" floater and inverse-floater are held by separate holders of each). For floaters that are linked with inverse-floaters, there may be no need to incur costs for remarketing and liquidity. Thus, the holder of a linked floater/inverse-floater interrelated pair may receive an amount of interest essentially equal to the fixed rate associated with the interrelated pair.

In another example, which example is intended to be illustrative and not restrictive, given a fixed rate of 5% and 1.35 times leverage, the chart of FIG. 1 illustrates how the inverse-floater rate varies inversely with short-term tax-exempt rates. More particularly, it is seen that if the short-term tax-exempt rate (e.g., the BMA Rate) rises to and remains above the level (the "Breakeven Floater Rate") at which the inverse-floater rate equals the corresponding bond yield, the yield on the inverse-floater over the life of a corresponding DSRF (i.e., a State Revolving Fund Debt Service Reserve Fund), for example, could be less than the corresponding bond yield. If the taxable investment yield were restricted to the bond yield, the overall yield on the invested assets would be below the bond yield, resulting in a loss versus the yield which could have been realized by investing the entire DSRF assets, for example, in taxable securities at the bond yield. For that to occur, BMA would have to average significantly above its average over the last 10 years. Moreover, by using liquidity of the taxable investments, as described below, to purchase floater(s) and link the floater(s) to corresponding inverse-floater(s), such a loss may be avoided, even in a high rate environment.

In another embodiment a method for investing yield restricted monies including bond proceeds associated with at least one bond having a bond yield, wherein the bond proceeds achieve a return above the bond yield to which the bond proceeds would otherwise be restricted by regulation is provided, comprising: obtaining the bond proceeds; and investing at least part of the bond proceeds in a tax-exempt inverse-floater financial instrument, wherein the inverse-floater financial instrument has a first rate of return which varies substantially inversely with regard to a second rate of return of a floater financial instrument.

In another example, which example is intended to be illustrative and not restrictive, the first rate of return may vary substantially inversely with regard to the second rate of return such that a combined return provided by the floater financial instrument and the inverse-floater financial instrument is essentially a fixed rate of return.

In another example, which example is intended to be illustrative and not restrictive, the floater financial instrument may be a tax-exempt financial instrument.

In another example, which example is intended to be illustrative and not restrictive, the floater financial instrument and the inverse-floater financial instrument may be selected from the group including, but not limited to: (a) direct market; and (b) secondary market.

In another example, which example is intended to be illustrative and not restrictive, the investment may be made in connection with a transaction selected from the group including, but not limited to: (a) a new money financing; (b) a new money refinancing; and (c) a refunding.

In another example, which example is intended to be illustrative and not restrictive, the bond proceeds may be selected from the group including, but not limited to: (a) direct bond proceeds; and (b) deemed bond proceeds.

In another example, which example is intended to be illustrative and not restrictive, a ratio between a value of the floater financial instrument and a value of the inverse-floater financial instrument may be selected from the group including, but not limited to: (a) a ratio less than 1; (b) a ratio equal to 1; and (c) a ratio greater than 1.

In another embodiment a method for investing yield restricted monies is provided, comprising: obtaining bond proceeds associated with at least one bond having a bond yield, wherein the bond proceeds comprise at least part of the yield restricted monies; and investing at least part of the bond proceeds in a tax-exempt inverse-floater financial instrument, wherein the inverse-floater financial instrument has a first rate of return which varies substantially inversely with regard to a second rate of return of a floater financial instrument; wherein the bond proceeds achieve a return above the bond yield to which the bond proceeds would otherwise be restricted by regulation.

In another example, which example is intended to be illustrative and not restrictive, the first rate of return may vary substantially inversely with regard to the second rate of return such that a combined return provided by the floater financial instrument and the inverse-floater financial instrument is essentially a fixed rate of return.

In another example, which example is intended to be illustrative and not restrictive, the floater financial instrument may be a tax-exempt financial instrument.

In another example, which example is intended to be illustrative and not restrictive, the floater financial instrument and the inverse-floater financial instrument may be selected from the group including, but not limited to: (a) direct market; and (b) secondary market.

In another example, which example is intended to be illustrative and not restrictive, the investment may be made in connection with a transaction selected from the group including, but not limited to: (a) a new money financing; (b) a new money refinancing; and (c) a refunding.

In another example, which example is intended to be illustrative and not restrictive, the bond proceeds may be selected from the group including, but not limited to: (a) direct bond proceeds; and (b) deemed bond proceeds.

In another example, which example is intended to be illustrative and not restrictive, a ratio between a value of the floater financial instrument and a value of the inverse-floater financial instrument may be selected from the group including, but not limited to: (a) a ratio less than 1; (b) a ratio equal to 1; and (c) a ratio greater than 1.

In another embodiment a method for investing yield restricted monies including bond proceeds associated with at least one bond having a bond term and a bond yield, wherein the bond proceeds achieve a return, over the term of the bond, above the bond yield to which the bond proceeds would otherwise be restricted by regulation is provided, comprising: obtaining the bond proceeds; investing, for at least part of the term of the bond, at least part of the bond proceeds in a tax-exempt inverse-floater financial instrument, wherein the inverse-floater financial instrument has a first rate of return which varies substantially inversely with regard to a second rate of return of a floater financial instrument; and investing, for at least part of the term of the bond, at least part of the bond proceeds in the floater financial instrument.

In another example, which example is intended to be illustrative and not restrictive, the floater financial instrument may be linked to the inverse-floater financial instrument for at least a part of the term of the bond.

In another example, which example is intended to be illustrative and not restrictive, the method may further comprise investing, for at least part of the term of the bond, at least part of the bond proceeds in a taxable financial instrument.

In another example, which example is intended to be illustrative and not restrictive, the investment in the inverse-floater financial instrument and the investment in the taxable financial instrument may be made before the investment in the floater financial instrument linked to the inverse-floater financial instrument.

In another example, which example is intended to be illustrative and not restrictive, the proceeds of at least one of a sale, a liquidation, and a maturity of the taxable financial instrument may be invested in at least part of the floater financial instrument.

In another example, which example is intended to be illustrative and not restrictive, the proceeds of at least one of the sale, the liquidation, and the maturity of the taxable financial instrument may be used to make at least part of the investment in the floater financial instrument at a point in time essentially halfway through the term of the bond.

In another example, which example is intended to be illustrative and not restrictive, the taxable financial instrument may be a taxable security.

In another example, which example is intended to be illustrative and not restrictive, the investment in the inverse-floater financial instrument and the investment in the floater financial instrument linked to the inverse-floater financial instrument may be made before the investment in the taxable financial instrument.

In another example, which example is intended to be illustrative and not restrictive, the inverse-floater financial instrument and the floater financial instrument may be de-linked, the floater financial instrument may be subject to at least one of a sale, a liquidation, and a maturity to generate floater financial instrument proceeds, and at least part of the floater financial instrument proceeds may be used to make at least part of the investment in the taxable financial instrument.

In another example, which example is intended to be illustrative and not restrictive, at least part of the floater financial instrument proceeds may be used to make at least part of the investment in the taxable financial instrument at a point in time essentially halfway through the term of the bond.

In another example, which example is intended to be illustrative and not restrictive, the taxable financial instrument may be a taxable security.

In another example, which example is intended to be illustrative and not restrictive, the first rate of return may vary substantially inversely with regard to the second rate of return such that a combined return provided by the floater financial instrument and the inverse-floater financial instrument is essentially a fixed rate of return.

In another example, which example is intended to be illustrative and not restrictive, at least one of the floater financial instrument and the inverse-floater financial instrument may be a bond.

In another example, which example is intended to be illustrative and not restrictive, each of the floater financial instrument and the inverse-floater financial instrument may be a bond.

In another example, which example is intended to be illustrative and not restrictive, the floater financial instrument may be a tax-exempt financial instrument.

In another example, which example is intended to be illustrative and not restrictive, the floater financial instrument and the inverse-floater financial instrument may be selected from the group including, but not limited to: (a) direct market; and (b) secondary market.

In another example, which example is intended to be illustrative and not restrictive, the investments may be made in connection with a transaction selected from the group including, but not limited to: (a) a new money financing; (b) a new money refinancing; and (c) a refunding.

In another example, which example is intended to be illustrative and not restrictive, the bond proceeds may be selected from the group including, but not limited to: (a) direct bond proceeds; and (b) deemed bond proceeds.

In another example, which example is intended to be illustrative and not restrictive, a ratio between a value of the floater financial instrument and a value of the inverse-floater financial instrument may be selected from the group including, but not limited to: (a) a ratio less than 1; (b) a ratio equal to 1; and (c) a ratio greater than 1.

In another example, which example is intended to be illustrative and not restrictive, the bond may be selected from the group including, but not limited to: (a) a fixed rate bond; and (b) a variable rate bond.

In another embodiment a method for investing yield restricted monies is provided, comprising: obtaining bond proceeds associated with at least one bond having a bond term and a bond yield, wherein the bond proceeds comprise at least part of the yield restricted monies; investing, for at least part of the term of the bond, at least part of the bond proceeds in a tax-exempt inverse-floater financial instrument, wherein the inverse-floater financial instrument has a first rate of return which varies substantially inversely with regard to a second rate of return of a floater financial instrument; and investing, for at least part of the term of the bond, at least part of the bond proceeds in the floater financial instrument; wherein the bond proceeds achieve a return, over the term of the bond, above the bond yield to which the bond proceeds would otherwise be restricted by regulation.

In another example, which example is intended to be illustrative and not restrictive, the floater financial instrument may be linked to the inverse-floater financial instrument for at least a part of the term of the bond.

In another example, which example is intended to be illustrative and not restrictive, the method may further comprise investing, for at least part of the term of the bond, at least part of the bond proceeds in a taxable financial instrument.

In another example, which example is intended to be illustrative and not restrictive, the investment in the inverse-floater financial instrument and the investment in the taxable financial instrument may be made before the investment in the floater financial instrument linked to the inverse-floater financial instrument.

In another example, which example is intended to be illustrative and not restrictive, the proceeds of at least one of a sale, a liquidation, and a maturity of the taxable financial instrument may be invested in at least part of the floater financial instrument.

In another example, which example is intended to be illustrative and not restrictive, the proceeds of at least one of the sale, the liquidation, and the maturity of the taxable financial instrument may be used to make at least part of the investment in the floater financial instrument at a point in time essentially halfway through the term of the bond.

In another example, which example is intended to be illustrative and not restrictive, the taxable financial instrument may be a taxable security.

In another example, which example is intended to be illustrative and not restrictive, the investment in the inverse-floater financial instrument and the investment in the floater financial instrument linked to the inverse-floater financial instrument may be made before the investment in the taxable financial instrument.

In another example, which example is intended to be illustrative and not restrictive, the inverse-floater financial instrument and the floater financial instrument may be de-linked, the floater financial instrument may be subject to at least one of a sale, a liquidation, and a maturity to generate floater financial instrument proceeds, and at least part of the floater financial instrument proceeds may be used to make at least part of the investment in the taxable financial instrument.

In another example, which example is intended to be illustrative and not restrictive, at least part of the floater financial instrument proceeds may be used to make at least part of the investment in the taxable financial instrument at a point in time essentially halfway through the term of the bond.

In another example, which example is intended to be illustrative and not restrictive, the taxable financial instrument may be a taxable security.

In another example, which example is intended to be illustrative and not restrictive, the first rate of return may vary substantially inversely with regard to the second rate of return such that a combined return provided by the floater financial instrument and the inverse-floater financial instrument is essentially a fixed rate of return.

In another example, which example is intended to be illustrative and not restrictive, at least one of the floater financial instrument and the inverse-floater financial instrument may be a bond.

In another example, which example is intended to be illustrative and not restrictive, each of the floater financial instrument and the inverse-floater financial instrument may be a bond.

In another example, which example is intended to be illustrative and not restrictive, the floater financial instrument may be a tax-exempt financial instrument.

In another example, which example is intended to be illustrative and not restrictive, the floater financial instrument and the inverse-floater financial instrument may be selected from the group including, but not limited to: (a) direct market; and (b) secondary market.

In another example, which example is intended to be illustrative and not restrictive, the investments may be made in connection with a transaction selected from the group including, but not limited to: (a) a new money financing; (b) a new money refinancing; and (c) a refunding.

In another example, which example is intended to be illustrative and not restrictive, the bond proceeds may be selected from the group including, but not limited to: (a) direct bond proceeds; and (b) deemed bond proceeds.

In another example, which example is intended to be illustrative and not restrictive, a ratio between a value of the floater financial instrument and a value of the inverse-floater financial instrument may be selected from the group including, but not limited to: (a) a ratio less than 1; (b) a ratio equal to 1; and (c) a ratio greater than 1.

In another example, which example is intended to be illustrative and not restrictive, the bond may be selected from the group including, but not limited to: (a) a fixed rate bond; and (b) a variable rate bond.

In another embodiment a method for investing yield restricted monies including bond proceeds associated with a portfolio containing at least two bonds, wherein each of the bonds has a respective bond term and a respective bond yield, wherein the portfolio has a term overlapping at least the terms of each of the bonds, wherein an aggregate bond yield is formed of a combination of the yields of each of the bonds, and wherein the bond proceeds achieve an aggregate return, over the term of the portfolio, above the aggregate bond yield to which the bond proceeds would otherwise be restricted by regulation is provided, comprising: obtaining the bond proceeds; and investing, for at least part of the term of a first one of the bonds contained in the portfolio, at least part of the bond proceeds in a tax-exempt inverse-floater financial instrument, wherein the inverse-floater financial instrument has a first rate of return which varies substantially inversely with regard to a second rate of return of a floater financial instrument.

In another example, which example is intended to be illustrative and not restrictive, the term of the first one of the bonds in the portfolio may differ from the term of a second one of the bonds in the portfolio.

In another example, which example is intended to be illustrative and not restrictive, the method may further comprise investing, for at least part of the term of the first one of the bonds in the portfolio, at least part of the bond proceeds in the floater financial instrument.

In another embodiment a method for investing yield restricted monies is provided, comprising: obtaining bond proceeds associated with a portfolio containing at least two bonds, wherein each of the bonds has a respective bond term and a respective bond yield, wherein the portfolio has a term overlapping at least the terms of each of the bonds, wherein an aggregate bond yield is formed of a combination of the yields of each of the bonds, and wherein the bond proceeds comprise at least part of the yield restricted monies; and investing, for at least part of the term of a first one of the bonds contained in the portfolio, at least part of the bond proceeds in a tax-exempt inverse-floater financial instrument, wherein the inverse-floater financial instrument has a first rate of return which varies substantially inversely with regard to a second rate of return of a floater financial instrument; wherein the bond proceeds achieve an aggregate return, over the term of the portfolio, above the aggregate bond yield to which the bond proceeds would otherwise be restricted by regulation.

In another example, which example is intended to be illustrative and not restrictive, the term of the first one of the bonds in the portfolio may differ from the term of a second one of the bonds in the portfolio.

In another example, which example is intended to be illustrative and not restrictive, the method may further comprise investing, for at least part of the term of the first one of the bonds in the portfolio, at least part of the bond proceeds in the floater financial instrument.

In another embodiment the present invention may be applied to a State Revolving Fund ("SRF") bond program. In this regard it is noted that for the purposes of the present application the term "reserve fund" is intended to include, but not be limited to, an SRF reserve fund (e.g., an SRF debt service reserve fund ("DSRF")) or an SRF escrow). Further, for the purposes of the present application the terms "program equity" and "corpus allocation" are intended to include, but not be limited to, equity derived from capitalization grants and/or state matching funds. The equity may be in the form of loans and or cash (e.g., negotiable notes, security investments, etc.). Further still, for the purposes of the present application when "program equity" or "corpus allocation" are said to be invested, such "program equity" or "corpus allocation" may be invested from an SRF reserve fund.

In any case, such an SRF program may be structured to achieve unrestricted earnings on at least a portion of program equity associated therewith. More particularly, a mechanism may be provided to achieve an investment yield on DSRF assets, for example, in excess of the yield (such as the arbitrage yield) on the related bonds (i.e., bond yield), without being subject to yield reduction payments.

In another example, which example is intended to be illustrative and not restrictive, this outcome may be achieved by: (i) investing a portion of the DSRF assets in tax-exempt inverse floating rate securities and the balance in taxable securities or (ii) investing the entire DSRF assets in tax-exempt inverse floating rate securities and counting on other unrestricted taxable assets to hedge the inverse floating rate securities in a rising interest rate environment.

In another embodiment a method for operating a state revolving fund bond program is provided, comprising: obtaining program equity; and investing at least part of the program equity in an inverse-floater financial instrument, wherein the inverse-floater financial instrument has a first rate of return which varies substantially inversely with regard to a second rate of return of a floater financial instrument.

In another example, which example is intended to be illustrative and not restrictive, the first rate of return may vary substantially inversely with regard to the second rate of return such that a combined return provided by the floater financial instrument and the inverse-floater financial instrument is essentially a fixed rate of return.

In another example, which example is intended to be illustrative and not restrictive, at least one of the floater financial instrument and the inverse-floater financial instrument may be a bond.

In another example, which example is intended to be illustrative and not restrictive, each of the floater financial instrument and the inverse-floater financial instrument may be a bond.

In another example, which example is intended to be illustrative and not restrictive, each of the floater financial instrument and the inverse floater financial instrument may be selected from the group including, but not limited to: (a) a tax-exempt financial instrument; and (b) a taxable financial instrument.

In another example, which example is intended to be illustrative and not restrictive, the floater financial instrument and the inverse-floater financial instrument may be selected from the group including, but not limited to: (a) direct market; and (b) secondary market.

In another example, which example is intended to be illustrative and not restrictive, the investment may be made in connection with a transaction selected from the group including, but not limited to: (a) a new money financing; (b) a new money refinancing; and (c) a refunding.

In another example, which example is intended to be illustrative and not restrictive, a ratio between a value of the floater financial instrument and a value of the inverse-floater financial instrument may be selected from the group including, but not limited to: (a) a ratio less than 1; (b) a ratio equal to 1; and (c) a ratio greater than 1.

In another example, which example is intended to be illustrative and not restrictive, the method may further comprise purchasing at least one new financial instrument to replace a called inverse-floater financial instrument for the remaining portion of a term associated with the called inverse-floater financial instrument.

In another example, which example is intended to be illustrative and not restrictive, the new financial instrument may be a taxable security.

In another example, which example is intended to be illustrative and not restrictive, the state revolving fund bond program may include at least one bond and the taxable security may have a yield which is at least equal to a yield on at least one of the bonds included in the state revolving fund bond program.

In another example, which example is intended to be illustrative and not restrictive, the state revolving fund bond program may include at least one bond and the method may further comprise refunding at least one of the bonds included in the state revolving fund bond program and purchasing at least one new financial instrument to replace a called inverse-floater financial instrument.

In another example, which example is intended to be illustrative and not restrictive, the new financial instrument may be a taxable security.

In another example, which example is intended to be illustrative and not restrictive, the taxable security may have a yield which is at least equal to a yield on at least one refunded bond.

In another example, which example is intended to be illustrative and not restrictive, the method may further comprise purchasing at least one tax-exempt security to replace a called inverse-floater financial instrument.

In another example, which example is intended to be illustrative and not restrictive, the method may further comprise selling the floater financial instrument and the inverse-floater financial instrument at a premium as at least one fixed rate financial instrument.

In another example, which example is intended to be illustrative and not restrictive, each of the floater financial instrument, the inverse-floater financial instrument, and the fixed rate financial instrument may be a bond.

In another example, which example is intended to be illustrative and not restrictive, the state revolving fund bond program may include at least one bond and the method may further comprise investing the proceeds of at least one of a sale, a liquidation, and a maturity of the fixed rate bond in a non-tax-exempt investment at a yield which is up to a yield on at least one of the bonds included in the state revolving fund bond program.

In another example, which example is intended to be illustrative and not restrictive, the inverse-floater financial instrument may be tax-exempt and the method may further comprise investing at least part of the program equity in a taxable investment.

In another example, which example is intended to be illustrative and not restrictive, the method may further comprise terminating the taxable investment if the inverse-floater financial instrument is called.

In another example, which example is intended to be illustrative and not restrictive, the floater financial instrument and the inverse-floater financial instrument may be issued by a borrower associated with the state revolving fund bond program.

In another example, which example is intended to be illustrative and not restrictive, the state revolving fund bond program may include at least one bond and the bond may be selected from the group including, but not limited to: (a) a fixed rate bond; and (b) a variable rate bond.

In another example, which example is intended to be illustrative and not restrictive, the method may further comprise hedging the investment in the inverse-floater financial instrument by using one or more taxable assets which can be liquidated to obtain monies that can be utilized to purchase one or more variable rate securities to link to the inverse-floater financial instrument to provide a fixed rate return.

In another embodiment a method for investing program equity associated with a state revolving fund bond program is provided, comprising: investing at least part of the program equity in an inverse-floater financial instrument, wherein the inverse-floater financial instrument has a first rate of return which varies substantially inversely with regard to a second rate of return of a floater financial instrument.

In another example, which example is intended to be illustrative and not restrictive, the first rate of return may vary substantially inversely with regard to the second rate of return such that a combined return provided by the floater financial instrument and the inverse-floater financial instrument is essentially a fixed rate of return.

In another example, which example is intended to be illustrative and not restrictive, at least one of the floater financial instrument and the inverse-floater financial instrument may be a bond.

In another example, which example is intended to be illustrative and not restrictive, each of the floater financial instrument and the inverse-floater financial instrument may be a bond.

In another embodiment a method for refunding at least one existing bond included in a state revolving fund bond program is provided, comprising: structuring a refunding bond to include an investment of at least part of the program equity associated with the state revolving fund bond program in an inverse-floater financial instrument, wherein the inverse-floater financial instrument has a first rate of return which varies substantially inversely with regard to a second rate of return of a floater financial instrument; and refunding the existing bond based upon the refunding bond.

In another example, which example is intended to be illustrative and not restrictive, a return on the inverse-floater financial instrument may be based upon a short term referenced rate and a referenced fixed rate.

In another example, which example is intended to be illustrative and not restrictive, the return on the inverse-floater financial instrument may be based upon a short term referenced rate and a referenced fixed rate according to the following formula:

$$((LR+1) \times RFR) - (\text{Index} + \text{Premium})$$

where LR is the leverage ratio of floater financial instrument value over inverse-floater financial instrument value, RFR is the referenced fixed rate, Index is a rate determining index, and Premium is a desired rate premium.

In another embodiment a method for operating a state revolving fund bond program including program equity and at least one bond with a term is provided, comprising: investing, for at least part of the term of the bond, at least part of the program equity in an inverse-floater financial instrument, wherein the inverse-floater financial instrument has a first rate of return which varies substantially inversely with regard to a second rate of return of a floater financial instrument; and investing, for at least part of the term of the bond, at least part of the program equity in the floater financial instrument.

In another example, which example is intended to be illustrative and not restrictive, the floater financial instrument may be linked to the inverse-floater financial instrument for at least a part of the term of the bond.

In another example, which example is intended to be illustrative and not restrictive, the method may further comprise investing, for at least part of the term of the bond, at least part of the program equity in a taxable financial instrument.

In another example, which example is intended to be illustrative and not restrictive, the investment in the inverse-floater financial instrument and the investment in the taxable financial instrument may be made before the investment in the floater financial instrument linked to the inverse-floater financial instrument.

In another example, which example is intended to be illustrative and not restrictive, the proceeds of at least one of a sale, a liquidation, and a maturity of the taxable financial instrument may be invested in at least part of the floater financial instrument.

In another example, which example is intended to be illustrative and not restrictive, the proceeds of at least one of the sale, the liquidation, and the maturity of the taxable financial instrument may be used to make at least part of the investment in the floater financial instrument at a point in time essentially halfway through the term of the bond.

In another example, which example is intended to be illustrative and not restrictive, the taxable financial instrument may be a taxable security.

In another example, which example is intended to be illustrative and not restrictive, the investment in the inverse-floater financial instrument and the investment in the floater financial instrument linked to the inverse-floater financial instrument may be made before the investment in the taxable financial instrument.

In another example, which example is intended to be illustrative and not restrictive, the inverse-floater financial instrument and the floater financial instrument may be de-linked, the floater financial instrument may be subject to at least one of a sale, a liquidation, and a maturity to generate floater financial instrument proceeds, and at least part of the floater financial instrument proceeds may be used to make at least part of the investment in the taxable financial instrument.

In another example, which example is intended to be illustrative and not restrictive, at least part of the floater financial instrument proceeds may be used to make at least part of the investment in the taxable financial instrument at a point in time essentially halfway through the term of the bond.

In another example, which example is intended to be illustrative and not restrictive, the taxable financial instrument may be a taxable security.

In another example, which example is intended to be illustrative and not restrictive, the first rate of return may vary substantially inversely with regard to the second rate of return such that a combined return provided by the floater financial instrument and the inverse-floater financial instrument is essentially a fixed rate of return.

In another example, which example is intended to be illustrative and not restrictive, at least one of the floater financial instrument and the inverse-floater financial instrument may be a bond.

In another example, which example is intended to be illustrative and not restrictive, each of the floater financial instrument and the inverse-floater financial instrument may be a bond.

In another example, which example is intended to be illustrative and not restrictive, each of the floater financial instrument and the inverse floater financial instrument may be selected from the group including, but not limited to: (a) a tax-exempt financial instrument; and (b) a taxable financial instrument.

In another example, which example is intended to be illustrative and not restrictive, the floater financial instrument and the inverse-floater financial instrument may be selected from the group including, but not limited to: (a) direct market; and (b) secondary market.

In another example, which example is intended to be illustrative and not restrictive, the investments may be made in connection with a transaction selected from the group including, but not limited to: (a) a new money financing; (b) a new money refinancing; and (c) a refunding.

In another example, which example is intended to be illustrative and not restrictive, a ratio between a value of the floater financial instrument and a value of the inverse-floater financial instrument may be selected from the group including, but not limited to: (a) a ratio less than 1; (b) a ratio equal to 1; and (c) a ratio greater than 1.

In another example, which example is intended to be illustrative and not restrictive, the bond may be selected from the group including, but not limited to: (a) a fixed rate bond; and (b) a variable rate bond.

In another example, which example is intended to be illustrative and not restrictive, the taxable financial instrument may have a yield which is at least equal to a yield on the bond included in the state revolving find bond program.

In another example, which example is intended to be illustrative and not restrictive, the floater financial instrument and the inverse-floater financial instrument may be issued by a borrower associated with the state revolving fund bond program.

In another example, which example is intended to be illustrative and not restrictive, the method may further comprise hedging the investment in the inverse-floater financial instrument by using one or more taxable assets which can be liquidated to obtain monies that can be utilized to purchase one or more variable rate securities to link to the inverse-floater financial instrument to provide a fixed rate return.

In another embodiment a method for operating a state revolving fund bond program including at least one bond with a term is provided, comprising: obtaining program equity; investing, for at least part of the term of the bond, at least part of the program equity in an inverse-floater financial instrument, wherein the inverse-floater financial instrument has a first rate of return which varies substantially inversely with regard to a second rate of return of a floater financial instrument; and investing, for at least part of the term of the bond, at least part of the program equity in the floater financial instrument.

In another example, which example is intended to be illustrative and not restrictive, the floater financial instrument may be linked to the inverse-floater financial instrument for at least a part of the term of the bond.

In another example, which example is intended to be illustrative and not restrictive, the method may further comprise investing, for at least part of the term of the bond, at least part of the program equity in a taxable financial instrument.

In another embodiment a method for refunding at least one existing bond included in a state revolving fund bond program, wherein the state revolving fund bond program also includes program equity is provided, comprising: structuring a refunding bond with a term; and refunding the existing bond based upon the refunding bond; wherein the structure of the refunding bond includes: (a) the investment, for at least part of the term of the refunding bond, of at least part of the program equity in an inverse-floater financial instrument, wherein the inverse-floater financial instrument has a first rate of return which varies substantially inversely with regard to a second rate of return of a floater financial instrument; and (b) the investment, for at least part of the term of the refunding bond, of at least part of the program equity in the floater financial instrument.

In another example, which example is intended to be illustrative and not restrictive, the floater financial instrument may be linked to the inverse-floater financial instrument for at least a part of the term of the refunding bond.

In another example, which example is intended to be illustrative and not restrictive, the method may further comprise investing, for at least part of the term of the refunding bond, at least part of the program equity in a taxable financial instrument.

In another embodiment of the present invention an SRF program may invest at least a portion of program equity in a non-hedged inverse-floater financial investment, such as a bond. By investing program equity in such a non-hedged inverse-floater bond, an SRF issuer could achieve a current yield substantially (e.g., as much as a couple of hundred basis points) above the bond yield (to which taxable investment yields are restricted) and even significantly above current taxable yields. Further, it is believed that essentially none of the return on a non-hedged inverse-floater bond such as described above would be subject to yield restriction or rebate. In addition, it is believed that the SRF bonds could also be refunded without affecting the yield on the inverse-floater investments.

Of note, the inverse-floater's yield would increase if short-term rates fall and would decrease if short-term rates rise. In one example, which example is intended to be illustrative and not restrictive, the return on the inverse-floater (on a non-hedged basis) would remain above the bond yield unless BMA rises by more than a certain amount (e.g., 200 basis points).

One challenge in the use of an inverse-floater for this purpose relates to the call provisions on the interrelated pair (i.e., the floater/inverse-floater pair). If the inverse-floater is subject to redemption, the SRF investments could be replaced in an unfavorable market environment. Moreover, such an unfavorable market environment could be exacerbated by the fact that the remaining term of the investments might be significantly shorter than the original maturity. In this regard, it is noted that the market environment that "counts" is the one that exists at the call date when the inverse-floater would be replaced.

One solution would be to use a non-callable interrelated pair. In addition to avoiding issues relating to redemption, this would also facilitate the use of a premium inverse-floater and reduce the possibility of reaching the maximum floater rate. However, to motivate the issuer to issue non-callable bonds, it might be necessary to significantly lower the interrelated pair's fixed yield (as distinguished from coupon). Such a reduction in fixed yield would also reduce the yield on the inverse-floater by the fixed yield reduction times the ratio between the interrelated pair's total amount and the amount of the inverse-floater. Hence, for a traditionally structured interrelated pair (e.g., having a 1 to 1 ratio), a 10 basis point reduction in the interrelated pair's fixed rate results in a reduction of 20 basis points in the inverse-floater's rate.

Alternatively, the SRF could purchase inverse-floater(s) that are callable after the call date for the SRF bond(s) and rely on the SRF's ability at the inverse-floater(s)'s call date to do one of the following at or before the inverse-floater(s)'s call date:

(1) Purchase taxable securities (at a yield at least equal to the yield on the SRF bond(s) to replace the inverse-floater(s) for the remaining portion of the inverse-floater(s)'s original term; and/or (2) Refund the SRF bond(s) at a lower yield and purchase taxable investments at not less than the yield on the refunding SRF bond(s); and/or (3) If rates are higher at the call date, purchase traditional tax-exempt securities to replace the inverse-floater(s).

In another embodiment of the present invention an SRF program may sell an interrelated pair of financial investments, such as bonds, for a profit as fixed rate bond(s). More particularly, in the event that fixed interest rates decline, the SRF could have the option of calling in the inverse-floater(s) and selling the interrelated pair (after acquiring the corresponding floater, for example) at a premium as fixed rate bond(s). It is believed that the premium from the sale of a tax-exempt interrelated pair bond, like the interest thereon, would not be subject to yield restriction or rebate. Further, it is believed that the proceeds of the sale, including the premium, could then be invested taxably at up to the bond yield.

In another embodiment of the present invention an SRF program may mitigate risk by investing in part in inverse-floater(s) and in part in taxable investment(s). More particularly, the SRF could eliminate essentially all of the risk of investing yield restricted funds relating to a fixed rate SRF bond issue in inverse-floater(s) by investing a portion of such funds in inverse-floater(s) and investing the other portion in taxable investment(s) that permit the SR-F to terminate the investment(s) if the SRF should decide to call in the inverse-floater(s). In one specific example, which example is intended to be illustrative and not restrictive, half of the funds could be invested in inverse-floater(s) and the other half of the funds could be invested in the taxable investment(s).

Initially, additional return earned by the SRF on the portion of the funds invested in inverse-floater(s) would in effect be spread over the entire fund, effectively reducing the additional return in half in this example (but essentially eliminating even the modest risk associated with a non-hedged approach). If the rate on the inverse-floater(s) were to fall below the fixed rate on the interrelated pair, the SRF could purchase the inverse-floater(s) and realize a return equal to the yield on the interrelated pair which, it is believed, should at worst be only slightly lower than the SRF bond yield. In one specific example, which example is intended to be illustrative and not restrictive, the funds invested taxably could be a pro-rata portion of each maturing investment. In another specific example, which example is intended to be illustrative and not restrictive, the funds invested taxably could be the investments relating either to the first or last maturing investments.

In another specific example, which example is intended to be illustrative and not restrictive, the yield on the interrelated pair might be less than the SRF bond yield although given the strength of an SRF credit and, for an issuer like the New York State Environmental Facilities Authority ("EFC"), the New York State trading benefit, the difference might be slight. In any event, it is believed that the present value of a slightly reduced yield on the SRF investments in the future should be less than the impact of the significant additional earnings realized in the early years from the inverse-floater(s).

Further, if the SRF bonds are refunded, the SRF could have the choice of: (a) linking each component of the interrelated pair and having a fixed rate investment above the refunding bond yield; and/or (b) continuing to invest in a combination of the inverse-floater(s) and taxable investment(s) with a yield (taking account of yield reduction payments) essentially equal to the refunding bond yield.

Further still, until each component of the interrelated pair are linked, the taxable investment(s) could provide liquidity so that the subsidy escrow could still serve as a reserve for the SRF bond(s). After each component of the interrelated pair are linked, liquidity could still be provided by the SRF's ability to de-link the interrelated pair and sell or remarket the floater(s). Moreover, if additional funds were needed, the linked interrelated pair could be sold.

Further still, if the SRF chooses the option of investing only a portion of its funds (e.g., half) in inverse-floater(s), the problem of the yield on the floater(s) jumping to the maximum rate prematurely could be addressed as follows. In the event that a pre-determined condition is met, give the holder(s) of the floater(s) the right to tender their bond(s) for purchase by the issuer (wherein such obligation may be secured by the issuer's right to tender the bond(s) to the SRF for purchase, for example). The condition that would permit such a tender by the owner(s) of the floater(s) could be structured in a number of ways. For example, which example is intended to be illustrative and not restrictive, the condition could be that the floater(s) cannot be remarketed for some period or that the rate on the floater(s) equals the maximum rate. In another specific example, which example is intended to be illustrative and not restrictive, the SRF's obligation to purchase could be secured by as little as its right to make funds available by terminating its taxable investment agreement or could be secured by the SRF's General Obligation. The assurance of being able to tender the floater(s) should encourage the holder(s) of the floater(s) to retain their bonds, even as BMA approaches the maximum rate on the floater(s), thus providing savings to the SRF. The existence of such a tender could also make it practical to utilize bond(s) with a lower underlying rating (assuming the bond(s) were insured) than might otherwise be advisable.

In another embodiment of the present invention an SRF program may purchase interrelated pair(s) issued by a benefiting underlying borrower or borrowers. More particularly, it might be permissible for an SRF issuer to purchase interrelated pair(s) issued by one or more of the SRF's underlying borrower(s). For example, which example is intended to be illustrative and not restrictive, EFC could purchase interrelated pair(s) issued by the New York City Municipal Water Finance Authority ("NYCMWFA" or "Authority"). In this regard, it is believed that none of the programmatic requirements applicable to use of proceeds of SRF bond(s) would apply to the purchase of Authority bond(s) for investment purposes. Moreover, it is believed that the Authority might benefit from a lower interest rate on its bond(s) issued as interrelated pair(s) and possibly from a lower takedown on the inverse-floater(s) portion of the financing. The Authority might also not need to refund its bond(s) because the benefit of lower rates might be extracted through an EFC refunding, together with receipt of earnings on the inverse-floater(s).

In another embodiment of the present invention an SRF program may invest in leveraged inverse-floater(s), wherein the amount of floaters is not necessarily equal to the amount of inverse-floaters. More particularly, the SRF's investment returns may be further enhanced by investing in leveraged inverse-floater(s). Of note, swings in the market value of the inverse-floater(s) could be a problem for investors. This is because issuing inverse-floater(s) on a leveraged basis may increase the volatility of market value and lower the maximum rate on the floater(s), thus increasing the possibility that the rate on the floater(s) could approach or exceed the maximum rate.

In one specific example, which example is intended to be illustrative and not restrictive, rather than having a 1 to 1 relationship between floater(s) and inverse-floater(s), the relationship could be 2 to 1 as illustrated below:

TABLE 2

| Fixed Interest | $30,000 | times | 5.10% | equals | $1,530 |
| Floater Interest | ($20,000) | times | 2.50% | equals | ($500) |
| Floater Expenses | ($20,000) | times | 0.28% | equals | ($56) |
| Inverse-Floater Interest | | | | Total | $974 |
| Inverse-Floater Yield | $974 | divided by | $10,000 | equals | 9.74% |

In another calculation, if the floater rate decreases to 1.75% for example, the inverse-floater rate would be 11.24%. On the other hand, if the floater rate increases to 3.50% for example, the inverse-floater rate would be 7.74%.

Since the maximum interest available on the interrelated pair is $1530 (given the 5.10% fixed interest parameter), the maximum interest that can be paid on either component is $1530 less $56 or 7.37%, at which rate the other component would bear interest at 0%.

With regard to such leveraging, it is noted that: (a) if the inverse-floater(s) are leveraged, the SRF may not have finds to purchase the floater(s) and consolidate the bonds; (b) even using the leveraged inverse-floater approach, it is believed that the SRF would likely realize a superior return over a wide rage of interest rates; and (c) federal tax regulations may limit the amount of permitted leverage.

With further regard to such leveraging, it is noted that in primary market floater/inverse-floater issues, tax regulations may limit the amount of floater(s) to 1.35 times the amount of inverse-floater(s) (referred to as 1.35 times leverage). It is also possible to create inverse floating rate obligations in the secondary market. In the context of secondary floater/inverse-floater issues, it is not uncommon for the amount of floater(s) to be as much as 9.5 times the amount of inverse-floater(s) (i.e., 9.5 times leverage).

In another embodiment, to fully hedge the inverse-floater interest rate risk, the amount of taxable investment(s) may essentially equal the amount of floater(s) to which the inverse-floater(s) are related. The taxable investment(s) may serve at least two functions. First, in combination with inverse-floater(s), the taxable investment(s) may create an overall yield in excess of the bond yield (prior to any yield reduction payment on the taxable investment(s)). As long as the taxable investment yield exceeds the all-in floater cost, (i.e., the floater rate plus remarketing and liquidity costs) the overall yield on the invested assets will exceed the fixed rate on the interrelated pair. Secondly, if rates rise significantly, the taxable investment(s) may provide liquidity to enable the SRF issuer to purchase the corresponding floater(s) and link the floater(s) to the inverse-floater(s) in the event that the net yield on the invested assets (after taking account of any required yield reduction payments) would be below the fixed rate of the interrelated pair.

In one specific example, which example is intended to be illustrative and not restrictive, the taxable investment(s) may bear a short-term taxable rate (e.g. LIBOR). In recent years, short-term tax-exempt rates have averaged approximately 65% of LIBOR. Even in the current low interest rate environment, it is believed that LIBOR substantially exceeds the all-in floater cost. So, initially, the overall investment yield would be significantly above the fixed rate of the interrelated pair. Under this approach, the taxable rate would initially be below the bond yield. However, if rates were later to rise so that LIBOR exceeded the bond yield, the SRF issuer could be subject to making yield reduction payments. However, it is believed that yield reduction payments would be required only to the extent that the overall yield on the taxable investment(s) (including such investment(s) during prior periods) exceeds the bond yield. Even if the floater rate were above the Breakeven Floater Rate, the overall yield may exceed the fixed rate on the interrelated pair as long as the SRF issuer were not required to make yield reduction payments on the taxable investment(s). Thus, it would likely not be necessary to link the floater(s) and inverse-floater(s) as long as yield reduction payments were not required to be made.

In another specific example, which example is intended to be illustrative and not restrictive, the SRF issuer could invest from the beginning in one or more taxable investments (at or above the bond yield) that provide some degree of liquidity. (If the yield of the taxable investment(s) exceeds the bond yield, the excess would be subject to yield reduction payments.) For example, which example is intended to be illustrative and not restrictive, the SRF issuer could invest in GICs with a call option after 5 years. Initially this may result in a higher overall yield (even after yield reduction payments) on invested asset(s) than the investment approach discussed above. However, if rates were to rise to the point that the yield on the taxable investment(s) in the approach discussed above would exceed the bond yield, then there would be essentially no difference in the overall return under the two approaches. One potential drawback of this second approach is that prior to the effective date of the call option, the SRF issuer would be unable to use the taxable investment(s) to link the floater(s) and inverse-floater(s). However, the SRF issuer would likely want to link the floater(s) and inverse-floater(s) (to the extent that funds could be withdrawn from the taxable investment(s)) whenever the floater rate exceeds the Breakeven Floater Rate. In the event that the floater(s) and inverse-floater(s) were linked and then later de-linked, the SRF issuer could either return to the same investment strategy or utilize short-term taxable investment(s) as described above in the first investment strategy.

In another embodiment of the present invention floater(s) may be purchased to lock in arbitrage yield in a rising rate environment. In this regard, the taxable investment(s) may permit the SRF issuer to draw on the proceeds invested therein (subject to any applicable conditions) for the purpose of purchasing the floater(s) and linking them with the related inverse-floater(s). If short-term rates should rise to the point that the interest rate on the floater(s) drops below the bond yield, the SRF issuer could purchase the floater(s) and link them with the inverse-floater(s), thus achieving a minimum investment yield equal to the fixed rate of the interrelated pair. This structure in effect permits the SRF issuer to place a floor on the yield of its DSRF investments, for example, equal to the fixed rate of the interrelated pair.

Viewed from a different perspective, the strategy of investing in a combination of inverse-floater(s) and taxable investment(s) gives the SRF issuer the ability to benefit from any current low short-term tax-exempt rates and to continue to benefit even as interest rates rise, as long as the floater rate is below the Breakeven Floater Rate. Moreover, the ability to link the floater(s) and inverse-floater(s) in effect provides a cap on the floater rate at that rate (the "Floater Cap Rate") at which (I) the combination of the inverse-floater yield and the yield on the taxable securities would equal (II) the yield on the linked floater(s) and inverse-floater(s), that is, the fixed rate of the interrelated pair. The Floater Cap Rate exists because, by linking the floater(s) and inverse-floater(s) and locking in an investment return equal to the fixed rate of the interrelated pair, the SRF issuer can essentially avoid the adverse impact of an increase in short-term tax-exempt rates above the Floater Cap Rate.

It is noted that BMA has averaged approximately 3.5% for the last ten years and has not substantially exceed 3.5% for any significant portion of that period. BMA is even lower today and given the weakness of the economy, can be expected to remain significantly lower in the immediate future. Therefore an SRF issuer can expect to achieve significant savings from earnings on inverse-floater(s) in excess of the bond yield over the near term. If rates as remain low, the SRF issuer may achieve dramatic savings over the life of the DSRF, for example. However, if in the future rates rise significantly and remain high, by linking the floater(s) and inverse-floater(s), the SRF issuer may effectively cap later increases in short-term rates above the Floater Cap Rate that would result in a rate on the DSRF assets, for example, less than the fixed rate of the interrelated pair. If short-term tax-exempt rates (e.g., the BMA rate) later decline below the Floater Cap Rate, the SRF issuer could de-link the floater(s) and inverse-floater(s) and reinvest in one or more taxable securities. The practical assurance of savings in the early years, together with the ability to link and de-link whenever advantageous, may create a high likelihood that the investment strategy will result in an overall yield on invested asset(s) significantly above the bond yield.

Of note, the inverse-floater investment(s) could consist either of traditional inverse-floater(s) or of one or more inverse floating rate securities created in the secondary market from one or more fixed rate municipal bonds, for example. Traditional floater/inverse-floater interrelated pairs are typically highly rated or insured municipal bonds. In the context of a secondary market inverse-floater, the SRF issuer may likewise own an interest in a highly rated or insured municipal bond. When the secondary floater/inverse-floater interrelated pair is not linked, the SRF issuer may own an inverse floating rate interest in the bond. When the secondary floater/inverse-floater interrelated pair is linked, the SRF issuer may be entitled to the interest on the whole bond. In either case, the credit owned by the SRF issuer may be a highly rated or insured municipal bond. With respect to the secondary market inverse-floater(s), the SRF issuer may also be obligated to purchase any of the secondary market floater(s) tendered by the holder thereof. Just as with the direct issuance of variable rate debt, the obligation to purchase tendered bonds may be primarily secured with a bank liquidity facility backed by the SRF issuer. However, the bank facility could be secured by the SRF issuer's ability to sell the taxable DSRF investment(s), for example, in order to purchase the secondary market floater(s).

Since the extent of the SRF issuer's variable rate exposure relating to the inverse-floater investment(s) may be capped by the ability to link, it is believed that such inverse-floater investment(s) should not count as a variable rate liability for rating purposes.

An additional value of the above-described approach is that if rates decline, the SRF issuer may sell the floater/inverse-floater pair, retain any capital gain (except, in one example, which example is intended to be illustrative and not restrictive, 10% of the premium in the case of a secondary market floater/inverse-floater pair) and reinvest the proceeds taxably at up to the bond yield.

In one specific example, which example is intended to be illustrative and not restrictive, a natural supplier of a primary market floater/inverse-floater pair to the EFC as SRF issuer may be NYCMWFA. In addition to making it possible for EFC to pay a higher subsidy, this may also result in lower transaction cost for the Authority.

In another embodiment of the present invention one or more existing bonds may be refunded. In one specific example, which example is intended to be illustrative and not restrictive, one or more non-callable bonds may be refunded to maturity with one or more refunding bonds that extend the average life of the debt and lower current debt service. Of course, while this example relates to refunding non-callable bonds, other bonds(s) such as callable bond(s) may possibly be refunded using the mechanism of the present invention under any permissible laws and regulations (e.g., tax laws and regulations). In any case, the refunding of the bond(s) may be used: (i) to achieve revenue relief by restructuring debt service; (ii) to achieve such revenue relief with present value savings over the cost of achieving similar revenue relief by extended the maturity of new money bond(s); and/or (iii) to achieve additional revenue relief as well as present value savings by realizing a yield on the refunding escrow investment(s) in excess of the bond yield. It is noted that since bond(s) to be refunded according to this example are non-callable, it is believed that the general requirement to call a refunded bond in the event that an advance refunding may produce savings does not apply.

While the SRF issuer could alternatively lower its debt service and revenue requirement as it issues new money bonds by extending the maturity of such new money bonds, it is believed that the refunding of the existing bonds may be used to accomplish essentially the same result at a substantially lower present value cost. In this regard, the savings from using the refunding (rather than new money) as a means to restructure the SRF issuer's debt may be realized through a lower cost of funds on the SRF issuer's future new money bonds which could be traditionally structured to provide level debt service without any maturity extension. Given a steepening of the yield curve, the present value savings from the refunding approach may be significant. While a similar result might be accomplished by a refunding to maturity other ones of the SRF issuer's bonds, such refunding would use up the SRF issuer's opportunity to refund those bonds for savings. Of note, if the refunded bonds were callable, the possibility of realizing savings from the investment strategy described below may require the refunded bonds to be called rather than being refunded to maturity. On the other hand, since the bonds of the present example are non-callable, it is believed that they cannot be refunded for savings and can be refunded to maturity, even in the event that savings are generated as a result of an escrow investment strategy.

As described below, the savings from the refunding may be substantially enhanced by utilizing an investment strategy that would result in an economic defeasance, but not a legal defeasance, of the refunded bonds. However, even in the context of an economic defeasance, the SRF issuer's revenue requirement may be reduced significantly for purposes of its rate covenant where the Senior Bond Resolution provides, in effect, that the rate covenant "may be adjusted by the SRF issuer provided that such adjustment will not adversely affect the then current ratings, if any, assigned to any series of Secured Bonds by each Rating Agency." It is believed that the various rating agencies should be comfortable with a reduction of the SRF issuer's rate covenant revenue requirement by the debt service on the economically defeased bonds, given the availability of a refunding escrow consisting of a combination of insured municipal bonds and a collateralized or highly rated GIC/repurchase agreement. Qualitatively, this may be viewed as similar to determining the debt service requirements on SRF bonds after the application of loan and by earnings on certain moneys.

In any case, as mentioned above, one embodiment of the present invention provides a mechanism to achieve an investment yield on the refunding escrow in excess of the refunding bond yield. This outcome may be achieved by: (i) investing a portion of the escrow in one or more tax-exempt inverse-floaters; and (ii) investing the balance of the escrow in one or more taxable securities.

Since the present example relates to an advance refunding, it is believed that yield reduction payments are not permitted. Therefore, the yield on the taxable investment(s) can not exceed the refunding bond yield. Potential investment(s) might include: (a) one or more collateralized GICs at the bond yield; and/or (b) one or more short-term taxable securities bearing yields not exceeding the refunding bond yield. Since the refunding bond yield is known, the rate on such investment(s) could exceed the bond yield to the extent that it is possible to invest in 0% an SLGS for a period of time sufficient to bring the yield on the taxable investment(s) in the escrow down to the bond yield (an SLGS is a special investment sold by the U.S. Treasury to a municipality which allows the municipality to specify the yield).

If short-term tax-exempt rates (e.g., BMA) rise to and remain above the level at which the inverse-floater rate equals the refunding bond yield (the "Breakeven BMA Rate"), the yield on the inverse-floater over the life of the escrow could be less than the refunding bond yield, resulting in a loss versus the yield that could have been realized by investing the entire escrow in one or more taxable securities at the bond yield. For that to occur, BMA would have to average significantly above its average over the last 10 years. By using the taxable portion of the escrow investment(s), as described below, to purchase the floater(s) and link the floater(s) and inverse-floater(s), such a loss maybe be avoided or minimized.

The taxable investment(s) would permit the SRF issuer to draw on the proceeds invested therein under certain conditions for the purpose of purchasing the floater(s) and linking them with the related inverse-floater(s). If short-term rates should rise to the point that the inverse-floater interest rate drops below the permitted yield on the refunding escrow, the SRF issuer could purchase the floater(s) and link them with the inverse-floater(s), thus achieving a minimum investment yield equal to the fixed rate of the interrelated pair. This structure in effect permits the SRF issuer to place a floor on the yield of its escrow investment(s) equal to the fixed rate of the interrelated pair. In effect, the ability to link the floater(s) and inverse-floater(s) gives the SRF issuer a cap on BMA at that BMA rate (the "BMA Cap Rate") at which (I) the combination of the inverse-floater yield and the yield on the taxable escrow securities would equal (II) the yield on the linked floater(s) and inverse-floater(s) (i.e., the fixed rate of the interrelated pair).

Since the refunding bond(s) may be used to extend the SRF issuer's maturity structure in this example, such refunding bond(s) will mature later than the refunded bond(s). Consequently, the escrow investment(s) will have maturities shorter than the refunding bond(s). Thus, the fixed rate on linked floater/inverse-floater pair(s) will likely be lower than the permitted yield on escrow investments) (i.e., the refunding bond yield). Thus, if BMA were to equal or exceed the BMA Cap Rate for the life of the escrow (in which event the escrow would be invested in the linked floater(s)/inverse-floater(s) for the life of the escrow), the SRF issuer would have negative carry in the escrow equal to the difference between the refunding bond yield and the fixed rate on the linked floater(s)/inverse-floater(s).

While techniques that can be used to reduce or eliminate this potential for negative carry are discussed below, it is noted that realistically BMA won't likely equal or exceed the BMA Cap Rate for the entire life of the refunding escrow. First, BMA has averaged approximately 3.5% for the last ten years and has not substantially exceed 3.5% for any significant portion of that period. Second, BMA is even lower today and given the weakness of the economy, can be expected to remain significantly lower in the immediate future. Therefore, an SRF issuer can expect to achieve significant savings from positive arbitrage on the inverse-floater(s) over the near term. If rates remain low, the SRF issuer may achieve dramatic savings over the life of the escrow. However, if in the future rates rise significantly and remain high, by linking the floater(s) and inverse-floater(s), the SRF issuer can effectively cap later increases in short-term rates above the BMA Cap Rate that would result in an overall yield on the escrow less than the permitted escrow yield. The practical assurance of savings in the early years (which may go to offset any negative carry in the event that the floater(s) and inverse-floater(s) are later linked) makes it unlikely that the investment strategy would result in an overall yield on the escrow less than the permitted yield. In essence, this investment strategy gives the SRF issuer the ability to receive the benefits of variable rate debt if rates remain low over the life of the escrow with the added benefit of a high degree of assurance that the SRF issuer's cost over the life of the escrow will not be higher as a result of having variable rate exposure.

It should be noted that the ability to link (either in the context of a new money bond or a refunding), as described above, to avoid incurring a loss (i.e., realizing an investment yield less than the bond yield) over the life of the escrow is believed to not be affected by the rules relating to the relative weighted average maturity ("WAM") of the taxable and tax-exempt portions of the escrow. It is believed that those rules, which are discussed below, do not constrain the SRF issuer's ability to link in order to avoid or minimize a loss. Rather, it is believed that the WAM rules affect the circumstances under which the floater(s) and inverse-floater(s) can be linked in order to lock in an investment yield on the escrow that is above the refunding bond yield. Of note, it is believed that the WAM rules apply only to advance refundings (i.e. not to new money and not to non-advance refundings).

Further, the amount of negative carry that may exist while the floater(s) and inverse-floater(s) are linked (i.e., the difference between the refunding bond yield and the fixed rate of the interrelated pair(s)) could also be reduced as described below. Of note, if these techniques are used to reduce or eliminate the potential for negative carry, the Breakeven BMA Rate and the BMA Cap Rate will converge, essentially eliminating the possibility that the use of this investment strategy may result in a loss.

I) By concentrating the inverse-floater investment(s) in the longer escrow investments, the spread between the floater/inverse-floater interrelated pair yield and the refunding bond yield could be reduced.

II) The refunding bonds could be structured as Refundable Principal Installments—either: (a) with a maturity in a predetermined year; or (b) as Option Bonds with a put in the predetermined year. In both cases, by selecting an appropriate predetermined year the interest rate would be fixed for at least the life of the refunding escrow. In either case, the SRF issuer may indicate by Supplemental Resolution its intent to amortize such bonds (or portions thereof) over a period that would result in a more level overall debt structure (e.g., the period may end 10 or 15 years after the predetermined year).

The potential benefit of the cap on short-term rates provided by the ability to link the floater(s) and inverse-floater(s) could be further enhanced if it were possible for the SRF issuer: (1) to link whenever BMA exceeded the BMA Cap Rate, even if the overall yield on the escrow were substantially above the bond yield; and (2) to de-link the floater(s) and inverse-floater(s) when short-term rates fall below the BMA Cap Rate. This may enable the SRF issuer to lock in and retain gains as well as to prevent an overall loss. However, it is believed that the arbitrage regulations provide that if a refunding escrow consists of a combination of taxable and tax-exempt securities and if the yield on either the tax-exempt portion or the whole escrow exceeds the bond yield, then the weighted average maturity of neither portion can exceed that of the other portion by more than 1.25 times. So, to use linking to lock in investment gains, the SRF issuer may have to comply with the 1.25 times test.

Roughly speaking, the SRF issuer may comply with the WAM rule by being linked for approximately half of the term of the escrow. Investing in floater(s) for half of the escrow term and in taxable investment(s) for the other half of the term has an equivalent impact on the WAM of both the taxable and tax-exempt portions of the escrow. For example, which example is intended to be illustrative and not restrictive, the SRF issuer could invest only in taxable investment(s) and inverse-floater(s) through year eight or nine (of a 16 to 18 year term) and then purchase the corresponding floater(s) and link the floater(s) and inverse-floater(s) for the remainder of the term of the escrow. Effectively, this ability to link (while complying with the WAM rule) gives the SRF issuer the ability to convert its variable rate liability (represented by the inverse-floater(s)) to a predetermined fixed rated (i.e., the refunding bond yield plus any negative carry while the floater(s) and inverse-floater(s) are linked) regardless of how high short-term and long-term rates may be at that time. Since it is believed that the "conversion to fixed" would be in compliance with the WAM rule, it is further believed that the SRF issuer may retain any savings realized prior to the conversion.

As mentioned above, the inverse-floater investment(s) may consist: (i) of one or more traditional inverse-floater securities; and/or (ii) of one or more inverse-floater securities created in the secondary market (e.g., from one or more fixed rate municipal bonds). Traditional floater/inverse-floater interrelated pair(s) are typically highly rated or insured municipal bonds. Hence, it is believed that there should be no problem relating to the SRF issuer's ability to invest in either inverse-floater(s) or linked floater/inverse-floater pair(s). In the context of secondary market inverse-floater(s) the SRF issuer would likewise own an interest in one or more highly rated or insured municipal bonds. When the secondary floater(s) and inverse-floater(s) are not linked, the SRF issuer would own an inverse floating rate interest in the bond(s). When the secondary floater(s) and inverse-floater(s) are linked, the SRF issuer would own the whole bond(s). In either case, the credit owned by the SRF issuer would be the highly rated or insured municipal bond(s). With respect to the secondary market inverse-floater(s), the SRF issuer may also be obligated to purchase any of the secondary market floater(s) tendered by the holder thereof. Just as when the SRF issuer issues variable rated debt directly, the obligation to purchase tendered bond(s) may be primarily secured with a bank liquidity facility. In addition, the SRF issuer may have the ability to sell the taxable escrow investment(s) in order to purchase the secondary market floater(s).

Since the extent of the SRF issuer's variable rate exposure relating to the inverse-floater investment(s) may be capped both by the ability to link to avoid a loss and by the ability to link (in compliance with the WAM rule) to convert to a fixed rate, it is believed that such an inverse-floater investment should not count against the SRF issuer's variable rate basket (e.g., 15% to 20%). Also, even assuming that escrow earnings were less than the bond yield for some period, the escrow may be used to retire the expected amount of refunded bond debt service and any shortfall (to the extent not offset by positive carry in later periods) may be reflected at the back end of the escrow. Thus, there would essentially not be any of the budgetary risk that typically accompanies direct variable rate debt.

Further, although not necessarily required, it may be simpler for the floater(s) and inverse-floater(s) in which the escrow is invested to be non-callable. While that might lower the yield on the linked floater/inverse-floater pair(s), the refunding bond(s) may also be non-callable, which may have an offsetting yield benefit.

In another embodiment of the present invention an SRF program may invest in inverse-floater(s) as investment(s) for variable rate issue(s). More particularly, the investment approaches described above could be used with variable rate SRF bond(s). In this regard, it is believed that the SRF's net borrowing cost (bond yield less investment earnings) may be even lower initially and if rates were to decline. On the other hand, it is believed that the SRF's net borrowing cost may increase above traditional fixed rate bond(s) as the rate on the floater(s) plus expenses approaches the fixed interrelated pair rate.

In another embodiment of the present invention an SRF program may employ one or more of a number of alternative strategies of using municipal investment(s). More particularly, one strategy involves issuing variable rate SRF bond(s) and investing the reserve in municipal(s). Under this strategy the borrower may be given a net return essentially like that of a holder of an inverse-floater, but without the ability to use linking to minimize the risk. Investing the reserve for a variable rate SRF issue in inverse-floater(s) has essentially the same effect as issuing leveraged inverse-floater(s). Two alternative approaches to benefiting from tax-exempt investment income include:

(1) Issuing variable rate SRF General Obligation bond(s) and investing the subsidy escrow in fixed rate municipal(s) and/or inverse-floater(s); and/or
(2) Issuing fixed rate SRF General Obligation bond(s) and investing the subsidy escrow in inverse-floater(s).

In another embodiment of the present invention an SRF program may mitigate risk by coupling inverse-floater(s) with one and/or more rate caps. More particularly, the risk of the investment return dropping below the bond yield might be eliminated or mitigated by using an interest rate cap on short-term rates or by using an interest rate swap. Unless the hedge were treated as integrated with the inverse-floater(s), it is believed that the hedge might be treated as a separate asset for arbitrage purpose and be subject to restriction or rebate. In other words, if the present value of the amounts received under the hedge exceeded the present value of amounts paid by the SRF, it is believed that the excess might be subject to restriction or rebate.

In another embodiment of the present invention one or more hedges may be imbedded in the interrelated pair. More particularly, by imbedding hedge(s) directly in the interrelated pair bond(s) under the documents of the issuer thereof, it is believed that essentially all of the current payments of interest on both floater(s) and inverse-floater(s), including payments derived from the hedge(s), could be made to be tax-exempt and therefore free from yield restriction. The issue generally would be who (among the issuer, the floater holder and the inverse-floater holder) takes the credit risk that the hedge provider defaults. It is believed that the potential benefit from the use of inverse-floater(s) or leveraged inverse-floater(s) is sufficient that it may be appropriate for the SRF as a holder of the inverse-floater(s) to take the credit risk (that the hedge provider defaults) and not to require that the issuer of the bond(s) also to be at risk for payments intended to be made from receipts under the hedge.

In another embodiment of the present invention inverse-floater(s) are used in a refunding. More particularly, it is believed that the approaches described above could also be used to accomplish the economic defeasance of outstanding municipal bond(s) at a significant savings to a refunding with taxable securities. Also, it is believed that the ability to invest at higher than the refunding bond yield may create savings even from refunding non-callable bonds.

Some of the practical constraints for refundings may include: (i) obtaining a sufficient amount of inverse-floater(s) maturing on the call date of the bond(s) to be refunded; and (ii) obtaining inverse-floater(s) for delivery on the closing date of the refunding. However, given a typical ten year call date on the refunded bond(s), it is believed that there should not be a problem making the interrelated pair non-callable.

Further, the variable investment yield might create some issues relating to sizing of the refunding issue since, at least for an economic defeasance with non-hedged inverse-floater(s), the investment yield could only be estimated. To the extent that the variability of earnings presents tax issues, there are a variety of possible approaches, including, but not limited to:

(1) In a low-to-high refunding, the escrow could be structured to collapse once earnings accrue in an amount sufficient to retire the refunded bonds.

(2) Earnings in excess of the estimated amount could be applied to retire additional bond(s) or to other permitted purposes. In this regard, the issuer could chose to either defease or call high coupon bonds.

Further still, refunded bonds are usually defeased and replaced by bonds secured at the same lien level as the refunded bonds were prior to being refunded. The defeased refunded bonds typically no longer count for purposes of the additional bonds test, rate covenant, or debt limit. In a refunding using inverse-floater(s), both the refunded and refunding bonds may still be outstanding. That could pose different issues for different types of bonds as follows:

(1) Appropriation bonds—No limits on issuance are revenue requirements. From a credit perspective, the availability of the escrow should be sufficient to avoid any credit issues with having any additional issue of bonds outstanding, even though there may a some slight uncertainty about the amount of prior bonds that will actually be retired from the escrow.

(2) General obligation bonds—If capacity under the debt limit is constrained, there could be a potential issue with having two sets of bonds outstanding.

(3) Revenue bonds—Potential issues include capacity under the additional bonds test and the need to reflect both the refunded and refunding bonds in the rate covenant revenue requirement.

In one specific example, which example is intended to be illustrative and not restrictive, the following approach may be used to minimize the impact of using an economic defeasance on both: (1) the revenue requirements under the additional bonds test and rate covenant; and (2) the credit of the refunding bond(s). This approach includes issuing refunding bond(s) that are technically subordinate to the prior bonds that have been economically defeased. Under the new, subordinate indenture, revenues raised for the purpose of the senior indenture to pay the defeased bond(s) would also count for the purpose of the rate covenant and additional bonds test under the subordinate indenture and the economically defeased bond(s) would be ignored. Since monies from the escrow would be provided to pay the refunded bond(s), the revenues provided by the issuer for payment of the refunded senior bond(s) could be pledged to the holders of the subordinate refunding bond(s), effectively giving the refunding bond(s) the same credit as the refunded bond(s). This could be done outside the senior indenture (e.g., through the Paying Agent). Although the rate covenant under the senior indenture would still be in effect, its impact could be modified through the subordinate indenture, simply by allowing the same revenues to be spread over a larger amount of subordinate obligations issued under the new indenture. From a credit standpoint, it is believed that the prior bond(s) that have been economically defeased with high-grade municipal and taxable investment(s) would be ignored in assessing the issuer's credit.

In another embodiment of the present invention inverse-floater(s) may be used with bond issue(s) with yield restricted proceeds. More particularly, the approach described below may be used: (1) to refund low-to-high refunding bond(s) or other bond(s) with transferred proceeds problems; and/or (2) for other bond issue(s) that have restricted bond proceeds.

This approach may operate as follows. Structure the refunding bond(s) as standalone inverse-floater(s) based on a short term referenced rate (which could be based on an index such as BMA or the actual rate on any series of the issuer's or any other issuer's bond(s)) and a referenced fixed rate approximating the current tax-exempt rate for bond(s) of a similar maturity.

So, for example, if the short-term referenced rate were BMA plus 32 basis points and the referenced fixed rate were 5.20%, the inverse-floater rate would be:

((LR+1)×5.20%)−(BMA+0.32%), where LR is the leverage ratio.

While the leverage ratio (i.e., the ratio of floater(s) to inverse-floater(s)) is traditionally 1, inverse-floater(s) can be constructed with a higher leverage ratio as described above (tax regulations may limit the leverage ratio).

To the extent that the issuer has non-hedged short-term debt such as VRDB's or floater(s) in an amount equal to the amount of inverse-floater(s) times the leverage ratio, the economic effect of issuing the inverse-floater(s) structured as described above is: (A) to hedge the short-term bonds and eliminate the issuer's interest rate exposure; and (B) to lock in an overall cost of funds taking account of both the inverse-floater(s) and the short-term debt equal to: (i) the referenced fixed rate, plus (ii) the spread between (a) the actual rate plus remarketing and liquidity on the issuer's short-term debt and (b) the short-term referenced rate (i.e., the actual rate plus remarketing and liquidity minus the referenced rate).

So, in the above example, if the leveraging ratio were 1, the liquidity and remarketing costs were 28 basis points (as would typically be the case for floater(s)), and the short-term debt traded at BMA plus 5 basis points, the issuer's overall cost of funds taking account of both the inverse-floater(s) and the short-term debt would be:

$$5.20\% - (BMA + 0.32\%)) + ((BMA + 0.05\% + 0.28\%) = 5.20\%$$

The short-term debt could consist of one or more issues of either pre-existing bond(s) or bond(s) issued contemporaneously with the inverse-floater(s) for new money or other purposes, provided that the inverse-floater(s) and short-term issue(s) were sufficiently separated to assure treatment as separate issues for tax purposes.

The inverse-floater(s) could include a minimum periodic or aggregate inverse-floater(s) rate sufficient to assure that the rate on the refunding bond(s) will not be less than the yield on the prior bond(s) to avoid having the refunding bond yield be less than the prior escrow yield (i.e., the yield on the prior bond(s)) in which event the excess would have to be paid to the U.S. treasury as a yield reduction payment. Given a minimum inverse-floater(s) rate, to assure that the aggregate cost of funds does not exceed the referenced fixed rate, it might be necessary for the issuer to hedge the rate on the short-term debt (e.g., by entering into a Cap).

If the inverse-floater(s) refund a prior issue of low-to-high refunding bond(s), then when the prior escrow becomes proceeds of the inverse-floater(s) on the call date for the prior issue, there would be no impact on the permitted yield on the escrow since the yield on the inverse-floater(s) would not be less than the yield on the prior issue of refunding bond(s).

If the inverse-floater(s) are issued for any other purpose such that there are a significant amount of unspent but yield restricted proceeds (e.g., SRF bonds or traditional advanced refunding bonds), then the restricted proceeds could be invested at the higher inverse-floater(s) yield. Economically, to the extent that the issuer has short-term debt that is hedged by the inverse-floater(s), the issuer would have achieved an overall fixed cost of borrowing approximately equal to the referenced fixed rate.

The hedged issue or issues of short-term debt would likely have a different final maturity from the inverse-floater(s), which could be 10 to 15 years longer than the final maturity of the inverse-floater(s), for example. If the issuer wants to hedge the interest rate exposure on the short-term debt after the final maturity of the inverse-floater(s), it may be necessary to use a financial product such as a forward swap with a forward start date on or after the final maturity of the inverse-floater(s), for example.

This approach could produce savings (by virtue of not causing any transferred proceeds penalty or reduction in the escrow yield) over simply issuing fixed rate bond(s) for both new money and refunding purposes, even if the referenced fixed rate were above the current market rate for traditional fixed rate bonds of the same maturity.

SRF's that are structured using the Reserve Fund model would be natural candidates to purchase the inverse-floater(s), particularly if the inverse-floater(s) have a minimum rate.

Purchasers of the inverse-floater(s) may be offered a right comparable to the right to link the interrelated pair of bonds. For example, which example is intended to be illustrative and not restrictive, if such purchasers were to purchase bond(s) of the issuer's bearing a short-term rate approximating the referenced short-term rate, the purchasers could effectively construct one or more fixed rate securities bearing: (1) a fixed rate equal to the referenced fixed rate; or (2) in the event the inverse-floater(s) have a minimum rate, a rate at least equal to the referenced fixed rate. However, in the example discussed above, the issuer's short-term debt pays interest at BMA plus 5 basis points. So, a holder of inverse-floater(s) who links the issuer's inverse-floater(s) and floater(s) would receive less than the referenced fixed rate by an amount equal to the liquidity and remarketing costs (e.g., 28 basis points). The issuer could enhance the ability of the holder of the inverse-floater(s) to use de facto linking (of the issuer's short-term debt and inverse-floater(s)) to create fixed rate bond(s) by including in its short-term debt a provision allowing the holder thereof to elect to give up its right to tender its bond(s) for remarketing for some minimum period of time and to receive interest during such period equal to: (a) the interest rate set by the remarketing agent; plus (b) the amount that would otherwise be spent by the issuer for remarketing and liquidity cost. In the example above, the holder of the floater(s) would receive the floater(s) rate set by the remarketing agent plus 28 basis points. Thus, linked floater and inverse-floater bond(s) would bear interest at the fixed referenced rate. In another example, which example is intended to be illustrative and not restrictive, an issuer could even charge a basis point or more for facilitating such de facto linking. Such charge could be assessed by increasing the short-term rate during the period of such an election by less than its avoided costs of remarketing and liquidity Further, rather than hedging short-term debt, the inverse-floater(s) could hedge any other liability or asset having characteristics similar to short-term debt, such as synthetically created short-term liabilities, for example.

Further, in another embodiment of the present invention the average life of the DSRF is essentially the same as the bond average life, and the fixed rate on a linked floater/inverse-floater interrelated pair should approximate the bond yield.

Further, in another embodiment of the present invention the amount of interest payable to an inverse-floater holder may equal: (a) interest at the fixed rate of the floater/inverse-floater interrelated pair, minus (b) interest on the floater at BMA, minus (c) remarketing and liquidity costs on the floater.

Further, it is noted that an existing buyer must generally continue to hold floater(s) unless another buyer elects to purchase the bond(s). The interest rate on the floater(s) is reset through an auction process to the lowest rate sufficient to enable all interested seller(s) of floater(s) to sell their bond(s). However, if BMA were to exceed the maximum rate on the floater(s), it may not be possible to find new buyer(s). Therefore, if the rate on the floater(s) were to rise substantially and approach the maximum rate, the existing buyer(s) might attempt to sell for fear of being stuck with a below market security if BMA were to rise above the maximum rate so that no new buyer(s) could be found. This might cause the rate on the floater(s) to jump up to the maximum rate while BMA is still significantly lower.

Accordingly, another embodiment of the present invention is provided to mitigate this risk for inverse-floater(s) held by an SRF. More particularly, the holder of each inverse-floater may have the right to require the corresponding floater holder(s) to tender their bond(s) in order to enable the holder of the inverse-floater(s) to create a traditional fixed rate bond(s) at the original interrelated pair bond yield. This would enable the holder of the inverse-floater(s) to liquidate its position and essentially stop out any reduction in market value of its inverse-floater investment(s) or alternatively to sell the interrelated pair for a gain in the event that fixed rates decline.

Further, in another embodiment of the present invention the investment strategy (e.g., the strategy of investing in inverse-floater(s) and/or floater(s)) may be applied not only to investment(s) maturing on a single date but to a portfolio of investment(s), some of which may mature on different dates. Moreover, the inverse-floater(s) and/or floater(s) may be used either in connection with all of the investment(s) in the portfolio or any portion thereof.

In one example related to the SRF context, which example is intended to be illustrative and not restrictive, the investments of deemed bond proceeds that are restricted to the bond yield typically mature pro-rata to the bond maturities (e.g., the amount of each maturing investment may be one-half or one third of the amount of bonds maturing on each bond payment date). As a result, the average life of the investment portfolio may be the same as the average life of the bonds and, if inverse-floater(s) and/or floater(s) were used for the whole investment portfolio, the fixed rate on the linked floater(s)/inverse-floater(s) would approximate the yield on the bonds.

In another example related to the SRF context, which example is intended to be illustrative and not restrictive, inverse-floater(s) and/or floater(s) may be used only for the later maturing investments of a portfolio of yield restricted investments maturing over time. The earlier maturing investments may be made solely in traditional investments (e.g., taxable and/or tax-exempt). As a result, the average life of the linked floater(s)/inverse-floater(s) may be longer than the average life of the bonds and the fixed rate associated with the linked floater(s)/inverse-floater(s) may be higher than the bond yield. Consequently, the yield on the portfolio may be above the bond yield even if the floater(s)/inverse-floater(s) are ever linked.

In another example, which example is intended to be illustrative and not restrictive, inverse-floater(s) and/or floater(s) may be used only for the earlier maturing investments of a portfolio of yield restricted investments maturing over time (with the later maturing investments being made solely in traditional investments (e.g., taxable and/or tax-exempt)).

In another example, which example is intended to be illustrative and not restrictive, inverse-floater(s) and/or floater(s) may be used for one or more earlier maturing investments and one or more later maturing investments of a portfolio of yield restricted investments maturing over time (with one or more of the earlier maturing investments and one or more of the later maturing investments being made solely in traditional investments (e.g., taxable and/or tax-exempt)).

Of note, use of the above-described "different maturity dates" investment strategy is rather complicated in the context of refundings since the arbitrage regulations specifically regulate the average lives of the taxable and tax-exempt portions of a mixed taxable and tax-exempt portfolio.

In another example, which example is intended to be illustrative and not restrictive, by using inverse-floater(s) and/or floater(s) for at least some investments in a portfolio of investments that mature over time (e.g., using inverse-floater(s) and/or floater(s) only for some earlier maturing investments, using inverse-floater(s) and/or floater(s) only for some later maturing investments, or any combination or permutation thereof), a party may achieve a fixed rate on the linked floater(s)/inverse-floater(s) that exceeds one or more of the yields on the underlying bonds in the portfolio such that even when the floater(s)/inverse-floater(s) are linked the yield on the portfolio (e.g., an aggregate yield on the portfolio) may exceed the yield on the underlying bonds (e.g., an aggregate yield on the bonds).

Referring now to FIGS. 2A, 2B, and 2C, which respectively depict the leftmost, the middle, and the rightmost portions of a spreadsheet, one example of a financial analysis related to the present "different maturity dates" embodiment is shown. Once again, it is noted that this example is intended to be illustrative and not restrictive.

Of note, it is believed that under current U.S. tax laws and regulations bond proceeds associated with new money transactions (e.g., initial financings) and/or refunding transactions may be used to invest in interrelated pairs which are linked and/or de-linked as desired. An exception to the previous statement, however, is believed to apply under current U.S. tax laws and regulations to advance refundings. More particularly, it is believed that for advance refundings interrelated pairs may be linked and/or de-linked only under the following two circumstances: (1) interrelated pairs may be linked and/or de-linked at any time in order to prevent an overall loss (i.e., the overall yield on the bond proceeds would be below the bond yield); and (2) interrelated pairs may be linked and/or de-linked as long as compliance with the WAM rule discussed above is maintained.

While a number of embodiments of the present invention have been described, it is understood that these embodiments are illustrative only, and not restrictive, and that many modifications may become apparent to those of ordinary skill in the art. For example, the interrelated pair of financial instruments may comprise one or more of such proprietary financial instruments available in the market. More particularly, the floater/inverse-floater interrelated pair may comprise a PARS (Periodic Auction Reset Securities)/INFLOS (Inverse Floaters) pair, a FLOATS/RITES (Residual Interest Tax Exempt Securities) pair, and/or a RIBS (Residual Interest Bonds)/SAVRS (Select Auction Variable Rate Securities) pair. Further, while the interrelated pair of financial instruments has been described principally as comprising a pair of bonds, any other desired financial instruments may of course be used. Further still, the short-term component of a fixed rate security comprised of a floating rate and an inverse floating rate security could be structured as a variable rate demand bond, LIBOR-based floater, or other similar instrument rather than as a Dutch-auction product (as is a floater component such as PARS). Further still, if the present invention is used in connection with a refinancing or refunding, the refinancing or refunding could be a savings refinancing or refunding (e.g., a "high to low" refinancing or refunding in which old bond(s) are refinanced or refunded with lower coupon refinancing or refunding bond(s) and the proceeds of the refinancing or refunding bond(s) are used to call the refinanced or refunded bond(s) on their first call date) or a stretch out refinancing or refunding (e.g., a "low to high" refinancing or refunding in which the primary purpose is to reduce annual debt service by repaying debt over a longer period of time). Further still, any of the mechanisms described with reference to an SRF program may be used in the general yield restricted monies context as permitted by applicable laws and regulations (e.g., applicable U.S. tax laws and regulations). Further still, when the floater/inverse-floater financial instrument pair comprises one component forming a floater financial instrument having a first rate of return and another component forming an inverse-floater financial instrument having a second rate of return which varies substantially inversely with regard to the first rate of return hedging (e.g., of the inverse-floater financial instrument) may be provided. Further still, the floater financial instrument may be a tax-exempt financial instrument and/or a taxable financial instrument before being linked with an inverse-floater financial instrument as long as the floater financial instrument is tax-exempt upon being linked with the inverse-floater financial instrument. Further still, at least part of the bond proceeds may be invested in a taxable financial instrument and/or a tax-exempt financial instrument. Further still, the present invention may be used by any issuing party who can issue tax-exempt debt including, but not limited to, a municipal issuer and/or a 501(c)(3) issuer. Further still, an "aggregate bond yield" or an "aggregate return" may refer to a combined (i.e., total) yield or return provided by a number of financial instruments. Further still, it is to be understood that when the present invention is used in the context of a portfolio of financial instruments (e.g., with a number of different maturities), then any desired number of floater(s) and/or inverse-floaters(s) may be used as investments (and linked or de-linked as desired) and that any such floater(s) and/or inverse-floater(s) may be associated with any number of desired underlying financial instruments (e.g., bonds) at any time (either continuously or discontinuously throughout the term of the associated underlying financial instrument). Further still, an example of direct market is PARS/INFLOS and examples of secondary markets are TOCs (Floating Rate Tender Option Certificates) and TICs (Residual Trust Inverse Certificates). Further still, the present invention may be used to invest yield restricted monies associated with any desired types of financial instruments (not just bonds as principally described herein). Further still, the methods described may be embodied in a software program and/or a computer system.

What is claimed is:

1. A method for investing yield restricted monies, comprising:

obtaining bond proceeds associated with a portfolio containing at least two bonds, wherein the bond proceeds are from the issuance of the bonds by a bond issuer, wherein each of the bonds has a respective bond term and a respective bond yield, wherein the portfolio has a term overlapping at least the terms of each of the bonds, wherein an aggregate bond yield is formed of a combination of the yields of each of the bonds, and wherein the bond proceeds from the issuance of the bonds comprise at least part of the yield restricted monies; and investing on the part of the bond issuer, for at least part of the term of a first one of the bonds contained in the portfolio, at least part of the bond proceeds from the issuance of the bonds in a tax-exempt inverse-floater financial instrument, wherein the inverse-floater financial instrument has a first rate of return which varies substantially inversely with regard to a second rate of return of a floater financial instrument;

wherein the bond proceeds from the issuance of the bonds achieve an aggregate return, over the term of the portfolio, above the aggregate bond yield to which the bond proceeds from the issuance of the bonds would otherwise be restricted by regulation.

2. The method of claim 1, wherein the term of the first one of the bonds in the portfolio differs from the term of a second one of the bonds in the portfolio.

3. The method of claim 2, further comprising investing on the part of the bond issuer, for at least part of the term of the first one of the bonds in the portfolio, at least part of the bond proceeds from the issuance of the bonds in the floater financial instrument.

* * * * *